(12) United States Patent
Waldman et al.

(10) Patent No.: US 10,956,660 B2
(45) Date of Patent: *Mar. 23, 2021

(54) AUTOMATICALLY CONVERTING TEXT TO BUSINESS GRAPHICS

(71) Applicant: Microsoft Technology Licensing, LLC, Redmond, WA (US)

(72) Inventors: Lawrence Fubini Waldman, Redmond, WA (US); Dawn M. Wright, Seattle, WA (US); Gary A. Pritting, Issaquah, WA (US); Lutz Gerhard, Seattle, WA (US); Matthew J. Kotler, Kenmore, WA (US); Cynthia C. Shelly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 875 days.

This patent is subject to a terminal disclaimer.

(21) Appl. No.: 15/351,572

(22) Filed: Nov. 15, 2016

(65) Prior Publication Data
US 2017/0060827 A1    Mar. 2, 2017

Related U.S. Application Data

(63) Continuation of application No. 13/855,386, filed on Apr. 2, 2013, now Pat. No. 9,529,786, which is a (Continued)

(51) Int. Cl.
*G06F 3/00* (2006.01)
*G06F 40/166* (2020.01)
(Continued)

(52) U.S. Cl.
CPC ......... *G06F 40/166* (2020.01); *G06F 3/0482* (2013.01); *G06F 3/04817* (2013.01);
(Continued)

(58) Field of Classification Search
None
See application file for complete search history.

(56) References Cited

U.S. PATENT DOCUMENTS 4,531,150 A    7/1985 Amano
4,686,522 A    8/1987 Hernandez et al.
(Continued)

FOREIGN PATENT DOCUMENTS

CN    1530833 A    9/2004
EP    0 431 638 A1    6/1991
(Continued)

OTHER PUBLICATIONS

Steve Johnson, Show Me Microsoft Office Power Point 2003 (Year: 2003).*
(Continued)

*Primary Examiner* — Tam T Tran
(74) *Attorney, Agent, or Firm* — Merchant & Gould

(57) ABSTRACT

A facility for generating a graphic image is described. The facility receives from a user a body of text whose creation is not subject to any rules or prototypes. The facility discerns from the body of text a textual organization. The facility then generates a graphic image conveying the discerned textual organization.

20 Claims, 13 Drawing Sheets

Related U.S. Application Data continuation of application No. 11/351,341, filed on Feb. 9, 2006, now Pat. No. 8,438,486.

(51) Int. Cl.

| | | |
|---|---|---|
| *G06F 3/14* | (2006.01) | |
| *G06F 40/109* | (2020.01) | |
| *G06F 3/0481* | (2013.01) | |
| *G06F 3/0482* | (2013.01) | |
| *G06T 11/60* | (2006.01) | |
| *G06F 15/00* | (2006.01) | |
| *G06F 15/16* | (2006.01) | |
| *G06F 3/048* | (2013.01) | |

(52) U.S. Cl.
CPC .............. *G06F 3/14* (2013.01); *G06F 40/109* (2020.01); *G06T 11/60* (2013.01); *G06F 3/048* (2013.01); *G06F 15/00* (2013.01); *G06F 15/16* (2013.01); *G06T 2200/24* (2013.01)

(56) References Cited

U.S. PATENT DOCUMENTS

| | | |
|---|---|---|
| 4,996,665 A | 2/1991 | Nomura |
| 5,214,755 A | 5/1993 | Mason |
| 5,426,729 A | 6/1995 | Parker |
| 5,509,112 A | 4/1996 | Doi et al. |
| 5,535,134 A | 7/1996 | Cohn et al. |
| 5,557,722 A | 9/1996 | DeRose et al. |
| 5,596,691 A | 1/1997 | Good et al. |
| 5,619,631 A | 4/1997 | Schott |
| 5,649,216 A | 7/1997 | Sieber |
| 5,669,006 A | 9/1997 | Joskowicz et al. |
| 5,673,401 A | 9/1997 | Volk et al. |
| 5,732,229 A | 3/1998 | Dickinson |
| 5,818,447 A | 10/1998 | Wolf et al. |
| 5,867,386 A | 2/1999 | Hoffberg et al. |
| 5,872,867 A | 2/1999 | Bergen |
| 5,903,902 A | 5/1999 | Orr et al. |
| 5,909,220 A | 6/1999 | Sandow |
| 5,956,043 A | 9/1999 | Jensen |
| 5,956,737 A | 9/1999 | King et al. |
| 5,999,731 A | 12/1999 | Yellin et al. |
| 6,057,842 A | 5/2000 | Knowlton et al. |
| 6,057,858 A | 5/2000 | Desrosiers |
| 6,072,480 A | 6/2000 | Gorbet et al. |
| 6,081,816 A | 6/2000 | Agrawal |
| 6,161,098 A | 12/2000 | Wallman |
| 6,166,738 A | 12/2000 | Robertson et al. |
| 6,173,286 B1 | 1/2001 | Guttman et al. |
| 6,189,132 B1 | 2/2001 | Heng et al. |
| 6,204,849 B1 | 3/2001 | Smith |
| 6,204,859 B1 | 3/2001 | Jouppi et al. |
| 6,256,650 B1 | 7/2001 | Cedar et al. |
| 6,289,502 B1 | 9/2001 | Garland et al. |
| 6,289,505 B1 | 9/2001 | Goebel |
| 6,292,194 B1 | 9/2001 | Powel, III |
| 6,301,704 B1 | 10/2001 | Chow et al. |
| 6,305,012 B1 | 10/2001 | Beadle et al. |
| 6,308,322 B1 | 10/2001 | Serocki et al. |
| 6,320,602 B1 | 11/2001 | Burkhardt et al. |
| 6,324,686 B1 | 11/2001 | Komatsu et al. |
| 6,405,225 B1 | 6/2002 | Apfel et al. |
| 6,448,973 B1 | 9/2002 | Guo et al. |
| 6,456,305 B1 | 9/2002 | Qureshi |
| 6,593,933 B1 | 7/2003 | Xu et al. |
| 6,667,750 B1 | 12/2003 | Halstead et al. |
| 6,691,282 B1 | 2/2004 | Rochford et al. |
| 6,715,130 B1 | 3/2004 | Eiche et al. |
| 6,774,899 B1 | 8/2004 | Ryall et al. |
| 6,791,582 B2 | 9/2004 | Linsey et al. |
| 6,819,342 B2 | 11/2004 | Kitagawa et al. |
| 6,826,727 B1 | 11/2004 | Mohr et al. |
| 6,826,729 B1 | 11/2004 | Giesen et al. |
| 6,941,478 B2 | 9/2005 | Card et al. |
| 6,944,830 B2 | 9/2005 | Card et al. |
| 6,956,737 B2 | 10/2005 | Chen et al. |
| 6,957,191 B1 | 10/2005 | Belcsak et al. |
| 7,055,095 B1 | 5/2006 | Anwar |
| 7,055,096 B2 | 5/2006 | Namioka |
| 7,107,525 B2 | 9/2006 | Purvis |
| 7,178,102 B1 | 2/2007 | Jones et al. |
| 7,209,815 B2 | 4/2007 | Grier et al. |
| 7,231,602 B1 | 6/2007 | Trulove |
| 7,325,186 B2 | 1/2008 | Jones |
| 7,348,982 B2 | 3/2008 | Schorr et al. |
| 7,379,074 B2 | 5/2008 | Gerhard et al. |
| 7,406,660 B1 | 7/2008 | Sikchi |
| 7,423,646 B2 | 9/2008 | Saini et al. |
| 7,478,079 B2 | 1/2009 | Robertson |
| 7,743,325 B2 | 6/2010 | Berker et al. |
| 7,747,944 B2 | 6/2010 | Gerhard et al. |
| 7,750,924 B2 | 7/2010 | Berker |
| 8,134,575 B2 | 3/2012 | Wong et al. |
| 8,269,790 B2 | 9/2012 | Wong et al. |
| 8,438,486 B2 | 5/2013 | Waldman et al. |
| 8,510,657 B2 | 8/2013 | Gilbert et al. |
| 8,791,955 B2 | 7/2014 | Schorr et al. |
| 8,799,325 B2 | 8/2014 | Callens et al. |
| 9,489,359 B2 | 11/2016 | Gilbert et al. |
| 9,514,105 B2 | 12/2016 | Callens et al. |
| 9,529,786 B2 | 12/2016 | Waldman et al. |
| 9,619,910 B2 | 4/2017 | Wong et al. |
| 2001/0032151 A1 | 10/2001 | Paul |
| 2001/0035875 A1 | 11/2001 | Suzuki et al. |
| 2001/0051962 A1 | 12/2001 | Plotkin |
| 2002/0065852 A1 | 5/2002 | Hendrickson et al. |
| 2002/0107842 A1 | 8/2002 | Biebesheimer et al. |
| 2002/0111969 A1 | 8/2002 | Halstead, Jr. |
| 2002/0156808 A1 | 10/2002 | Duffy |
| 2003/0028562 A1 | 2/2003 | Shaughnessy |
| 2003/0065601 A1 | 4/2003 | Gatto |
| 2003/0069931 A1 | 4/2003 | Omura |
| 2003/0079177 A1 | 4/2003 | Brintzenhofe et al. |
| 2003/0126136 A1 | 7/2003 | Omoigui |
| 2003/0218641 A1 | 11/2003 | Longobardi |
| 2004/0001106 A1 | 1/2004 | Deutscher et al. |
| 2004/0004672 A1 | 1/2004 | Carlsgaard et al. |
| 2004/0021647 A1 | 2/2004 | Iwema et al. |
| 2004/0041838 A1 | 3/2004 | Adusumilli et al. |
| 2004/0111672 A1 | 6/2004 | Bowman et al. |
| 2004/0133854 A1 | 7/2004 | Black |
| 2004/0145603 A1 | 7/2004 | Soares |
| 2004/0148571 A1 | 7/2004 | Lue |
| 2004/0205602 A1 | 10/2004 | Croeni |
| 2005/0001837 A1 | 1/2005 | Shannon |
| 2005/0007382 A1 | 1/2005 | Schowtka et al. |
| 2005/0034083 A1 | 2/2005 | Jaeger |
| 2005/0091584 A1 | 4/2005 | Bogdan et al. |
| 2005/0094206 A1 | 5/2005 | Tonisson |
| 2005/0094207 A1 | 5/2005 | Lo et al. |
| 2005/0131777 A1* | 6/2005 | Davidson ............. G06Q 10/063 705/7.36 |
| 2005/0132283 A1 | 6/2005 | Diwan et al. |
| 2005/0157926 A1 | 7/2005 | Moravec et al. |
| 2005/0216832 A1 | 9/2005 | Giannetti |
| 2005/0240858 A1 | 10/2005 | Croft et al. |
| 2005/0273730 A1 | 12/2005 | Card et al. |
| 2005/0289466 A1 | 12/2005 | Chen |
| 2006/0064642 A1 | 3/2006 | Iyer |
| 2006/0066627 A1 | 3/2006 | Gerhard et al. |
| 2006/0066631 A1 | 3/2006 | Schorr et al. |
| 2006/0066632 A1 | 3/2006 | Wong |
| 2006/0070005 A1 | 3/2006 | Gilbert |
| 2006/0209093 A1 | 3/2006 | Berker et al. |
| 2006/0212801 A1 | 9/2006 | Berker et al. |
| 2006/0277476 A1 | 12/2006 | Lai |
| 2006/0294460 A1 | 12/2006 | Chao et al. |
| 2007/0006073 A1 | 1/2007 | Gerhard et al. |
| 2007/0055939 A1 | 3/2007 | Furlong et al. |
| 2007/0112832 A1 | 5/2007 | Wong |
| 2007/0186168 A1 | 8/2007 | Waldman et al. |
| 2008/0046803 A1 | 1/2008 | Beauchamp et al. |

(56) References Cited

U.S. PATENT DOCUMENTS

| | | |
|---|---|---|
| 2008/0136822 A1 | 6/2008 | Schoor et al. |
| 2008/0178107 A1 | 7/2008 | Lee et al. |
| 2008/0282147 A1 | 11/2008 | Schoor |
| 2008/0288916 A1 | 11/2008 | Tazoe |
| 2009/0019453 A1 | 1/2009 | Kodaganur |
| 2009/0119577 A1 | 5/2009 | Almbladh |
| 2009/0327954 A1 | 12/2009 | Danton |
| 2011/0055687 A1 | 3/2011 | Bhandar et al. |
| 2011/0225548 A1 | 9/2011 | Callens et al. |
| 2012/0127178 A1 | 5/2012 | Wong et al. |
| 2013/0024791 A1 | 1/2013 | Wong et al. |
| 2013/0232410 A1 | 9/2013 | Waldman et al. |
| 2013/0290839 A1 | 10/2013 | Gilbert et al. |
| 2014/0289613 A1 | 9/2014 | Callens et al. |
| 2014/0292767 A1 | 10/2014 | Schorr et al. |
| 2016/0371868 A1 | 12/2016 | Gilbert et al. |
| 2017/0060827 A1 | 3/2017 | Waldman et al. |
| 2017/0193683 A1 | 7/2017 | Wong et al. |
| 2017/0301122 A1 | 10/2017 | Schorr et al. |

FOREIGN PATENT DOCUMENTS

| | | |
|---|---|---|
| EP | 1 111 543 A2 | 6/2001 |
| EP | 1 111 543 A3 | 11/2002 |
| EP | 1643450 | 5/2012 |
| JP | 04-130585 A | 5/1992 |
| JP | 06-309128 | 11/1994 |
| JP | H09-109351 | 4/1997 |
| JP | 2001-500294 | 1/2001 |
| JP | 2002507289 A | 3/2002 |
| JP | 2002507301 A | 3/2002 |
| JP | 2003-052582 | 2/2003 |
| JP | 2003044464 A | 2/2003 |
| JP | 2004-220561 | 8/2004 |
| JP | 2005-275890 | 12/2005 |
| JP | 2006-506713 A | 2/2006 |
| KR | 10-1999-0229911 A | 4/1999 |
| KR | 10-1999-0034152 A | 5/1999 |
| KR | 10-2004-0041979 | 5/2004 |
| KR | 10-2004-0048236 A | 6/2004 |
| KR | 1020040073870 | 8/2004 |
| MX | 277871 | 7/2010 |
| RU | 2127449 | 3/1999 |
| RU | 2142162 | 11/1999 |
| RU | 2192040 C2 | 10/2002 |
| RU | 2218602 C2 | 12/2003 |
| TW | 578067 | 3/2004 |
| TW | 200406734 A | 5/2004 |
| WO | 198200726 | 3/1982 |
| WO | 1995/00916 | 1/1995 |
| WO | 199855953 | 10/1998 |
| WO | 1999/24267 | 5/1999 |
| WO | 2001/39019 A2 | 11/2000 |
| WO | 2001/039019 A2 | 5/2001 |
| WO | 01/80044 | 10/2001 |
| WO | 0237206 A2 | 5/2002 |
| WO | 03/052582 A1 | 6/2003 |
| WO | 2004/046972 A1 | 6/2004 |

OTHER PUBLICATIONS

Huiping Li et al., Automatic Text Detection and Trackiong in Digital Video, Jan. 1, 2000, IEEE, vol. 9, No. 1, pp. 147-156 (Year: 2000).*
Hanjing Li et al., Graphic Retrieval Based on Limited Semantics, Jan. 1, 2005, IEEE, pp. 1-5 (Year: 2005).*
Stefan Berner et al., A Visualization Concept for Hierarchical Object Models, Jan. 1, 1998, IEEE Xplore, pp. 1-4 (Year: 1998).*
Ji-Yeon Lee et al., Automatic Generation of Structured Hyperdocuments from Multi-Column Document Images, Jan. 1, 2000, IEEE Xplore, pp. 422-425 (Year: 2000).*
U.S. Appl. No. 14/307,668, Notice of Allowance dated Jul. 25, 2017, 4 pgs.
Indian Hearing Notice on Indian Application 2126/DEL/2005, dated Aug. 4, 2017, 2 pages.
Brazilian Office Action in Application PI0503982-7, dated Jul. 18, 2017, 10 pages.
Taiwan Office Action and Search Report Issued in Taiwan Patent Application No. 94126264, dated Mar. 12, 2012, 5 Pages.
"Notice of Allowance Issued in U.S. Appl. No. 11/081,323", dated Sep. 16, 2009, 3 Pages. (we had cited Sep. 18, 2009, above—typo).
"Timeline", Retrieved from «http://almende.github.io/chap-links-library/timeline.html», Retrieved on Apr. 13, 2013, 2 Pages.
Indian Office Action in Application 2126/DEL/2005, dated Jan. 25, 2017, 9 pgs.
European Office Action Issued in Patent Application No. 05108658.5, dated Nov. 8, 2006, 7 Pages.
U.S. Appl. No. 09/482,285, Office Action dated Mar. 14, 2002, 10 Pages.
Mexican Patent Office Action cited in Application No. PA/a/2005/009276, dated May 3, 2010, 11 pages (with Eng. Trans).
Japanese Office Action Issued in Patent Application No. 2005-253627, dated Dec. 1, 2010, 6 Pages (with English translation).
Japanese Notice of Rejection Issued in Patent Application No. 2006-064583, dated Apr. 20, 2011, 3 Pages (with Eng. Trans).
U.S. Appl. No. 14/307,668, Amendment and Response filed Mar. 20, 2017, 18 pgs.
"Create Diagrams in Word 2002, Excel 2002, and Powerpoint 2002"; http://office.microsoft.com/en-usassistance/HA-010346141033.aspx.; 2 pages.
"De Mail reader," downloaded Mar. 24, 2009, 2 pages. URL: http://de.openoffice.org/services/ReadMMsg?list=annouce&msg. No translation available, 2 pgs.
"Internet as a Source of Prior Art," downloaded Mar. 16, 2009 from Wikipedia, 3 pages. URL: http//en.wikipedia.org/wiki/Internet_as_a_source_of_prior_art, downloaded Mar. 24, 2009 (In German) 3 pages.
"OpenOffice.org 1.0.3.1 in deutsch veroffentlicht," downloaded Mar. 24, 2009, (in German), 4 pages.
"OpenOffice.org," downloaded Mar. 24, 2009; 19 pages. "OpenOffice.org," downloaded Mar. 24, 2009 (as cited as D8 in the Minutes from Oral Proceedings dated Jun. 8, 2009—in German, no translation available); URL: http://www.ooo-portal.de/modules.pnp?op=modload&name=News&, 19 pgs.
"Exploring the Layouts", 1999 software Publishing Corporation, 2 pgs.
"Proquis Compliance Management & Document Control Solutions"; http://wwws.proquis.com/allclear-text2chart.asp, 1 page.
"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 4 pgs.
A. C. Beers et al., "Rendering from Compressed Textures," Proceedings of SIGGRAPH '96, Aug. 1996, 4 pgs.
A. Fournier et al., "Computer Rendering of Stochastic Models," Communications of the ACM, Jun. 1982, vol. 25, No. 6, pp. 371-384.
About assigning columns in data files to custom property fileds, Microsoft Office Online. Copyright 2006 Microsoft Corporation. [Last Accessed: Apr. 27, 2006], 1 pg.
About breaking your organization chart across multiple pages, Microsoft Office Online. Copyright 2006 Microsoft Corporation. [Last Accessed: Apr. 27, 2006], 1 pg.
About charts, Microsoft Office Online. Copyright 2006 Microsoft Corporation. [Last Accessed: Apr. 27, 2006], 3 pgs.
About choosing actions and events for organization chart shapes, Microsoft Office Online. Copyright 2006 Microsoft Corporation. [Last Accessed: Apr. 27, 2006], 1 pg.
About choosing data file columns, Microsoft Office Online. Copyright 2006 Microsoft Corporation. [Last Accessed: Apr. 27, 2006], 1 pg.
About combination charts, Microsoft Office Online. Copyright 2006 Microsoft Corporation. [Last Accessed: Apr. 27, 2006], 1 pg.
About defining a new ODBC data source, Microsoft Office Online. Copyright 2006 Microsoft Corporation. [Last Accessed: Apr. 27, 2006], 1 pg.

(56) References Cited

OTHER PUBLICATIONS

About importing data, Microsoft Office Online. Copyright 2006 Microsoft Corporation. [Last Accessed: Apr. 27, 2006], 3 pgs.
About mapping fields from your data file to a Gantt chart, Microsoft Office Online. Copyright 2006 Microsoft Corporation. [Last Accessed: Apr. 27, 2006], 1 pg.
About Microsoft Visual Basic .NET code to UML mapping, Microsoft Office Online. Copyright 2006 Microsoft Corporation. [Last Accessed: Apr. 27, 2006], 3 pgs.
About Microsoft Visual C# code to UML mapping, Microsoft Office Online. Copyright 2006 Microsoft Corporation. [Last Accessed: Apr. 27, 2006), 3 pgs.
About Microsoft Visual C++ 7.0 code to UML mapping, Microsoft Office Online. Copyright 2006 Microsoft Corporation. [Last Accessed: Apr. 27, 2006], 3 pgs.
About ODBC data sources and organization charts, Microsoft Office Online. Copyright 2006 Microsoft Corporation. [Last Accessed: Apr. 27, 2006], 1 pg.
About OLAP source data in PivotTable and PivotChart reports, Microsoft Office Online. Copyright 2006 Microsoft Corporation. [Last Accessed: Apr. 27, 2006], 3 pgs.
About Organization Chart Wizard data, Microsoft Office Online. Copyright 2006 Microsoft Corporation. [Last Accessed: Apr. 27, 2006]1 pg.
About PivotTable and PivotChart source data, Microsoft Office Online. Copyright 2006 Microsoft Corporation. [Last Accessed: Apr. 27, 2006], 3 pgs.
About PivotTable reports, Microsoft Office Online. Copyright 2006 Microsoft Corporation. [Last Accessed: Apr. 27, 2006], 2 pgs.
About reverse engineering code to the UML, Microsoft Office Online. Copyright 2006 Microsoft Corporation. [Last Accessed: Apr. 27, 2006], 1 pg.
About selecting delimiters in a Gantt chart, Microsoft Office Online. Copyright 2006 Microsoft Corporation. [Last Accessed: Apr. 27, 2006], 1 pg.
About using Microsoft Query to retrieve external data, Microsoft Office Online. Copyright 2006 Microsoft Corporation. [Last Accessed: Apr. 27, 2006], 3 pgs.
Add, link, edit, or remove titles in a chart, Microsoft Office Online. Copyright 2006 Microsoft Corporation. [Last Accessed: Apr. 27, 2006], 2 pgs.
Advanced Timeline Options dialog box, Microsoft Office Online. Copyright 2006 Microsoft Corporation. [Last Accessed: Apr. 27, 2006], 1 pg.
Anonymous: "Extract of Online-Help for OpenOffice Impress (Stylist), Ver. 1.1.5, German Version," online! Apr. 2004, 2 pgs.
Australian Examiner's First Report dated Apr. 21, 2010 cited in Application No. 2005203708, 2 pgs.
Australian Examiner's First Report filed in Application No. 2005202720, dated Apr. 22, 2010; 2 pages.
Australian Examiner's Second Report filed in Application No. 2005202720, dated Aug. 30, 2010; 2 pages.
Australian Notice of Allowance in Application 2005202720 dated Feb. 10, 2011, 3 pgs.
Australian Notice of Allowance in Application 2005203708 dated Jun. 23, 2010, 3 pgs.
Australian Notice of Allowance in Application 2005203711 dated Nov. 9, 2010, 3 pgs.
Australian Office Action in Application 2005203711 dated Apr. 23, 2010, 2 pgs.
Available chart types, Microsoft Office Online. Copyright 2006 Microsoft Corporation. [Last Accessed: Apr. 27, 2006], 7 pgs.
Borland, Russell "Running Microsoft Word 97", 1997, Published by Microsoft Press, Pertinent pp. 60-61 (0247us01).
Bugfix-Release OpenOffice 1.0.3.1, Erschienen (Update), no English translation, Apr. 23, 2003, 1 page.
Canadian Notice of Allowance in Application 2511037, dated May 29, 2013, 1 page.
Canadian Notice of Allowance in Application 2517409, dated Sep. 20, 2013, 1 page.
Canadian Office Action in Application 2511037, dated Nov. 14, 2012, 3 pgs.
Canadian Office Action in Application 2517399, dated Mar. 22, 2013, 2 pgs.
Canadian Office Action in Application 2517409, dated Feb. 11, 2013, 6 pgs.
Canadian Office Action in Application 2517409, dated Sep. 19, 2012, 6 pgs.
CASEX ANNEX, dated Apr. 11, 2010 (cited in email communication from European Examiner on May 12, 20011 in European Application 05105366.8); 1 page.
Change Date and Time Formats dialog box, Microsoft Office Online. Copyright 2006 Microsoft Corporation. [Last Accessed: Apr. 7, 2006], 1 pg.
Change Mapping dialog box, Microsoft Office Online. Copyright 2006 Microsoft Corporation. [Last Accessed: Apr. 27, 2006], 1 pg.
Chart Wizard, Microsoft Office Online. Copyright 2006 Microsoft Corporation. [Last Accessed: Apr. 27, 2006], 4 pgs.
Chinese 1st Office Action in Application 200510088525.6 dated May 9, 2008, 18 pgs.
Chinese 1st Office Action in Application 200510099124.0 dated Jun. 20, 2008, 19 pgs.
Chinese 2nd Office Action in Application 200510088525.6 dated Nov. 7, 2008, 10 pgs.
Chinese 2nd Office Action in Application 200510099124.0 dated Dec. 26, 2008, 9 pgs.
Chinese 2nd Office Action in Application 201010587370.1, dated Mar. 12, 2012, 8 pgs.
Chinese 3rd Office Action in Application 200510088525.6 dated Feb. 27, 2009, 9 pgs.
Chinese 3rd Office Action in Application 200510099124.0 dated Apr. 17, 2009, 16 pgs.
Chinese 3rd Office Action in Application 201010587370.1, dated Aug. 8, 2013, 8 pgs.
Chinese Decision on Re-Examination in Application 201010587370.1, dated Apr. 7, 2013, 2 pgs.
Chinese Final Rejection in Application 201010587370.1, dated Sep. 5, 2012, 6 pgs.
Chinese First Office Action in Application 201010587370.1, dated Sep. 8, 2011, 8 pgs.
Chinese Fourth Office Action cited in Application No. 200510099124.0, dated Sep. 4, 2009, 7 pages.
Chinese Notice of Allowance in Application 200510088525.6 dated Jul. 17, 2009, 4 pgs.
Chinese Notice of Allowance in Application 200510099124.0 dated Sep. 15, 2010, 4 pgs.
Chinese Notice of Allowance in Application 2006100044984 dated Jan. 22, 2010, 2 pgs.
Chinese Notice of Allowance in Application No. 200510099652.6, dated Dec. 26, 2008, 4 pgs.
Chinese Office Action dated Aug. 29, 2008 cited in Application No. 2006100044498.4, 15 pgs.
Chinese Office Action dated Jul. 4, 2008 cited in Application No. 200510099652.6, 9 pgs.
Chinese Patent Office Sixth [sic—Fifth] Office Action cited in Application No. 200510099124.0, dated May 10, 2010, 6 pages.
Chinese Second Office Action dated Feb. 20, 2009 cited in Application No. 2006100044498.4, 19 pgs.
Chinese Third Office Action dated Jun. 19, 2009 cited in Application No. 2006100044498.4, 9 pgs.
Chou-Zukai, "Excel 2002, Windows XP General Edition", pp. 210-225 (2002) (cited in Japanese Patent Application No. 2005-187817, no translation available), in Japanese language, 18 pgs.
Configure Interval dialog box, Microsoft Office Online. Copyright 2006 Microsoft Corporation. [Last Accessed: Apr. 27, 2006], 1 pg.
Configure Milestone dialog box, Microsoft Office Online. Copyright 2006 Microsoft Corporation. [Last Accessed: Apr. 27, 2006], 1 pg.
Configure Timeline dialog box (Time Format tab), Microsoft Office Online. Copyright 2006 Microsoft Corporation. [Last Accessed: Apr. 27, 2006], 1 pg.

(56) References Cited

OTHER PUBLICATIONS

Configure Timeline dialog box (Time Period tab), Microsoft Office Online. Copyright 2006 Microsoft Corporation. [Last Accessed: Apr. 27, 2006] 1 pg.
Configure Working Time dialog box, Microsoft Office Online. Copyright 2006 Microsoft Corporation. [Last Accessed: Apr. 27, 2006], 1 pg.
Create a chart from data in a PivotTable report, Microsoft Office Online. Copyright 2006 Microsoft Corporation. [Last Accessed: Apr. 27, 2006], 1 pg.
Create a chart, Microsoft Office Online. Copyright 2006 Microsoft Corporation. [Last Accessed: Apr. 27, 2006], 2 pgs.
Create a Gantt chart in Excel, Microsoft Office Online. Copyright 2006 Microsoft Corporation. [Last Accessed: Apr. 27, 2006], 2 pgs.
Create a PivotChart report, Microsoft Office Online. Copyright 2006 Microsoft Corporation. [Last Accessed: Apr. 27, 2006], 3 pgs.
Create a PivotTable report, Microsoft Office Online. Copyright 2006 Microsoft Corporation. [Last Accessed: Apr. 27, 2006], 2 pgs.
Creating a Bubble chart, Microsoft Office Online. Copyright 2006 Microsoft Corporation. [Last Accessed: Apr. 27, 2006,]2 pgs.
Creating a Stock chart, Microsoft Office Online. Copyright 2006 Microsoft Corporation. [Last Accessed: Apr. 27, 2006], 2 pgs.
Creating a Surface chart, Microsoft Office Online. Copyright 2006 Microsoft Corporation. [Last Accessed: Apr. 27, 2006], 3 pgs.
Creating Pie of Pie and Bar of Pie charts, Microsoft Office Online. Copyright 2006 Microsoft Corporation. [Last Accessed: Apr. 27, 2006], 3 pgs.
Css Zen Garden, "The Beauty in CSS Design", retrieved from Archive.org. <http://web.archive.org/web/20031001180317/http://www.csszengarden.com/>, Oct. 1, 2003. Retrieved Nov. 8, 2009, 3 pgs.
D. J. Heeger et al., "Pyramid-Based Texture Analysis/Synthesis," pp. 1-10.
D. R. Peachey, "Solid Texturing of Complex Surfaces," Computer Graphics, vol. 19, No. 3, Jul. 1985, pp. 279-286.
DeBonet, JS, "Multiresolution Sampling Procedure for Analysis and Synthesis of Texture Images", Learning & Vision Group, Artificial Intelligence Laboratory, Massachusetts Institute of Technology, 8 pgs.
Diagram, Oxford English Dictionary, 2nd Edition (1989), Oxford University Press 1989, downloaded from http://www.oed.com/oed/00063080 (cited in email communication from European Examiner on May 12, 2011 in European Application 05105366.8); 2 pgs.
Diagramm—Wikipedia (in German), downloaded from http://de.wikipedia.org/wiki/Diagramm (cited in email communication from European Examiner on May 12, 2011 in European Application 05105366.8); 10 pgs.
European Brief Communication in Application 06111105.0, dated Sep. 17, 2012, 10 pgs.
European Communication dated Dec. 17, 2008 cited in Application No. 06111105.0, 8 pgs.
European Communication dated Jul. 10, 2009 cited in Application No. 06111105.0, 6 pgs.
European Decision to Refuse a European Application dated Jun. 12, 2009 in Application No. 05108636.1, 39 pages.
European Decision to Refuse in EP Application 06111105.0, dated Oct. 5, 2012, 27 pgs.
European E-mail communication from European Examiner cited in EP Application 05105366.8 dated May 12, 2011, 2 pgs.
European Exam Report in EP Application 05105366.8 dated Apr. 30, 2009, 9 pgs.
European Extended Search Report for EP 05 10 8636.1-2218, dated Jan. 2, 2006, 7 pgs.
European Minutes from Oral Proceedings, dated Jun. 8, 2009, in EP Application No. 05108636.1, 42 pages.
European Minutes of the Sep. 27, 2012 Oral Proceedings in EP Application 06111105.0, dated dated Oct. 5, 2012, 3 pgs.
European Notice of Allowance in Application 05105366.8 dated Jun. 21, 2011, 6 pgs.
European Official Communication in EP Application 051086361 dated Jun. 1, 2007, 7 pgs.
European Oral Summons in EP Application 06111105.0, dated May 15, 2012, 10 pgs.
European Search Report dated Feb. 13, 2006 cited in Application 05108658.5, 7 pgs.
European Search Report for EP 05105366.8, dated Jan. 2, 2006, 3 pgs.
Example of a reverse-engineered solution: FM Stocks, Microsoft Office Online. Copyright 2006 Microsoft Corporation. [Last Accessed: Apr. 27, 2006], 1 pg.
Export a SharePoint list to a spreadsheet, Microsoft Office Online. Copyright 2006 Microsoft Corporation. [Last Accessed: Apr. 27, 2006], 2 pgs.
Five ways to subtotal values in repeating data, Microsoft Office Online. Copyright 2006 Microsoft Corporation. [Last Accessed: Apr. 27, 2006], 5 pgs.
Gallant, John and Bergevin, Holly, Archive.org archive of "CSS Flyouts—Part One," [online] Jun. 24, 2005 [accessed Nov. 13, 2006], CommunityMX, Retrieved from Internet <URL:http://web.archive.org/web/20050624075147/http://www.communitymx.com/content/article.cfm?page=3&cid=55A69>, 2 pgs.
Gantt Chart Options dialog box (Date tab), Microsoft Office Online. Copyright 2006 Microsoft Corporation. [Last Accessed: Apr. 27, 2006], 1 pg.
Gantt Chart Options dialog box (Format tab), Microsoft Office Online. Copyright 2006 Microsoft Corporation. [Last Accessed: Apr. 27, 2006], 1 pg.
H.G. Schuster, "Deterministic Chaos, An Introduction," Second Revised Edition, pp. 200-207.
Heise Online: "OpenOffice 1.1.5 verfügbar" downloaded Jul. 28, 2010 (as cited as D5 in the Minutes from Oral Proceedings dated Jun. 8, 2009—in German, URL: http://www.heise.de/newsticker/meldung/OpenOffice-1-1-5-verfuegbar-130148.html English translation attached); 2 pages.
Insert Column dialog box, Microsoft Office Online. Copyright 2006 Microsoft Corporation. [Last Accessed: Apr. 27, 2006], 1 pg.
Intelligent User Interfaces: Components of Intelligent Interfaces. http://web.cs.wpLedu/Research/airgllntlntlintint-paper-components.html [Last Accessed: Nov. 30, 2005], 4 pgs.
Interactive information visualization. http://prefuse.sourceforge.net/ [Last Accessed: Nov. 30, 2005].
Isayama, K.' "SMI Edicolor 5", MAC Power, vol. 12, No. 4, pp. 134-135, Apr. 1, 2001, 7 pgs.
J. Torborg et al., "Talisman: Commodity Realtime 3D Graphics for the PC," Proceedings of SIGGRAPH 1996, 11 pgs.
J.P. Lewis, "Algorithms for Solid Noise Synthesis," Computer Graphics, vol. 23, No. 3, Jul. 1989, pp. 263-270.
Jan Smith, "Jan's PowerPoint Advanced: Images", pp. 7 and 8. obtained online on Mar. 12, 2008 at: http://web.archive.org/web/2005020822247/http://www.jegsworks.com/Lessons/presentations/advanced/images.htm, 9 pgs.
Japanese Final Notice of Rejection dated Aug. 10, 2011 in Application 2006-064583, 3 pgs.
Japanese Final Notice of Rejection in Application 2011-245199, dated Sep. 7, 2012, 4 pgs.
Japanese Final Rejection and Translation Summary in Application 2006064583, dated Dec. 1, 2011, 4 pgs.
Japanese Notice of Allowance in Application 2011-160788, dated Aug. 21, 2012, 4 pgs.
Japanese Notice of Allowance in Application 2011-245199, dated Jul. 17, 2013, 4 pgs.
Japanese Notice of Allowance in JP Application 2005-275890, dated Oct. 5, 2011, 5 pgs.
Japanese Notice of Rejection in Application 2011-245199, dated Apr. 16, 2012, 3 pgs.
Japanese Office Action dated Apr. 12, 2011 cited in JP Application 2005-253627, 5 pgs.
Japanese Official Notification of patent published in Official Gazette in Application 2005-187817, dated Dec. 7, 2011, 32 pgs.
Japanese Patent Office Notice of Rejection cited in Application No. 2005187817, dated Nov. 11, 2010; 5 pages.

(56) References Cited

OTHER PUBLICATIONS

Japanese Patent Office Notice of Rejection cited in Application No. 2005275890, dated Nov. 18, 2010; 9 pages.
K. Perlin, "An Image Synthesizer," Computer Graphics, vol. 19, No. 3, Jul. 1985, pp. 287-296.
Keyboard shortcuts, Microsoft Office Online. Copyright 2006 Microsoft Corporation. [Last Accessed: Apr. 27, 2006], 17 pgs.
Korean Final Notice of Rejection in Application 10-2005-0057172, dated Aug. 29, 2012, 2 pgs.
Korean Notice of Final Rejection in Application 10-2005-00738480, dated Apr. 30, 2012, 6 pgs.
Korean Notice of Preliminary Rejection and Translation Summary in Application 10200573848, dated Dec. 12, 2011, 6 pgs.
Korean Notice of Preliminary Rejection dated Feb. 23, 2012 cited in Application No. 10-2006-0007338, 6 pgs.
Korean Notice of Preliminary Rejection in Application 1020050073710, dated Jan. 31, 2012, 1 pg. English translation.
Korean Notice of Preliminary Rejection in Application 10-2005-57172, dated Jan. 25, 2012, 1 pg. English translation.
Korean Preliminary Rejection (English translation), Application 102006-0007338, dated Feb. 23, 2012, 2 pgs.
LingCh by Elod Csirmaz—Retrieved Date: Jan. 11, 2010, http://www.postminart.org/csirmaz/lingch.txt., 5 pgs.
Linuxforen.de, "OpenOffice.org 1.0.3.1 in deutsch veröffentlicht," downloaded Mar. 24, 2009 (as cited as D6 in the Minutes from Oral Proceedings dated Jun. 8, 2009—in German, no translation available); 3 pages.
M. Cox et al., "Multi-Level Texture Caching for 3D Graphics Hardware," In Proceedings of the 25th International Symposium on Computer Architecture, 1998, pp. 86-97.
M. Pharr et al., "Rendering Complex Scenes with Memory-Coherent Ray Tracing," Proceedings of SIGGRAPH 1997, pp. 1-8.
Malaysian Adverse Report in Application PI20054064, dated Jan. 15, 2013, 2 pgs.
Malaysian Adverse Report in Application PI20054064, dated Nov. 15, 2011, 3 pgs.
Malaysian Examination Report in Application PI 20054063, dated Sep. 15, 2011, 3 pgs.
Mexican Office Action dated Dec. 4, 2008 cited in Application No. PA/a/2005/009276 (not in English), 4 pgs.
Mexican Office Action dated May 25, 2009 cited in Application No. PA/a/2005/009276 (60001.0423MX01), 10 pgs.
Microsoft Office PowerPoint 2003 11.6564.6568 with Service Pack 2, Part of Microsoft Office Professional Edition 2003, 9 pgs.
Microsoft Office Word 2003 11.6568.6568 with Service Pack 2, Part of Microsoft Office Professional Edition 2003, 7 pgs.
Minoru Sendagi, "Word 2003 Perfect Master, Windows XP Kanzentaiou", pp. 500-507, 2003, 10 pgs.
Modeling exponential growth, Microsoft Office Online. Copyright 2006 Microsoft Corporation. [Last Accessed: Apr. 27, 2006], 2 pgs.
Online Training Solutions, Inc et al., "Microsoft Office PowerPoint 2003 Step by Step", Microsoft Press, Aug. 27, 2003, 105 pgs.
Outline a list of data in a worksheet, Microsoft Office Online. Copyright 2006 Microsoft Corporation. [Last Accessed: Apr. 27, 2006], 14 pgs.
Overview of security and protection in Excel, Microsoft Office Online. Copyright 2006 Microsoft Corporation. [Last Accessed: Apr. 27, 2006], 4 pgs.
P. Hanrahan et al., "A Language for Shading and Lighting Calculations," Computer Graphics, vol. 24, No. 4, Aug. 1990, pp. 289-298.
PivotTable and PivotChart Wizard, Microsoft Office Online. Copyright 2006 Microsoft Corporation. [Last Accessed: Apr. 27, 2006], 3 pgs.
PivotTable reports 101, Microsoft Office Online. Copyright 2006 Microsoft Corporation. [Last Accessed: Apr. 27, 2006], 11 pgs.
PivotTable terminology demystified, Microsoft Office Online. Copyright 2006 Microsoft Corporation. [Last Accessed: Apr. 27, 2006], 4 pgs.
R.L. Cook et al., "The Reyes Image Rendering Architecture," Computer Graphics, vol. 21, No. 4, Jul. 1987, pp. 95-102.
Reverse engineer Visual Studio .NET source code, Microsoft Office Online. Copyright 2006 Microsoft Corporation. [Last Accessed: Apr. 27, 2006], 1 pg.
Reverse engineered code in the Model Explorer tree view, Microsoft Office Online. Copyright 2006 Microsoft Corporation. [Last Accessed: Apr. 27, 2006], 2 pgs.
Roth, et al. "SageTools: An Intelligent Environment for Sketching, Browsing, and Customizing Data-Graphics". School of Computer Science. Carnegie Mellon University. Proceedings CHI'95 Human Factors in Computing Systems, ACM, May 1995, 2 pgs.
Russian Notice of Allowance in Application 2005130349 dated Oct. 30, 2009, 7 pgs.
Russian Notice of Allowance in Application 2005130361 dated Oct. 7, 2009, 16 pgs.
Russian Notice of Allowance in RU application 2005120365 dated Oct. 6, 2009, 4 pgs.
Screen Shots (Examiner generated) taken on Mar. 18, 2010 of Microsoft PowerPoint 2002, publicly released Mar. 5, 2001); cited in U.S. Appl. No. 11/013,655, 6 pgs.
Screen shots of Microsoft PowerPoint, 2002, (in U.S. Appl. No. 11/013,655 on Jan. 9, 2009), 15 pgs.
Screen shots of Microsoft PowerPoint, 2002, taken at Oct. 9, 2010, 6 pgs.
Show or hide a chart legend or data table, Microsoft Office Online. Copyright 2006 Microsoft Corporation. [Last Accessed: Apr. 27, 2006], 2 pgs.
Singleton, Roderick, "OpenOffice.org User Guide for Version 1.1.X", May 7, 2004, Online, XP002348571; retrieved from the Internet: URL:www.openoffice.org>, retrieved Sep. 30, 2005; pp. 253-284.
Statistica, StatSoft User Interface, http://www.statsoft.com/uniquefeatureslinterface.html (Last Accessed: Nov. 30, 2005), 6 pgs.
Styling Nested Lists, [online] Oct. 19, 2003 [accessed Nov. 13, 2006], SimpleBits, LLC, Retrieved from Internet<URL:http://www.simplebits.com/notebook/2003/10/19/styling_nested_lists.html./> pp. 1-5.
Synchronize Interval dialog box, Microsoft Office Online. Copyright 2006 Microsoft Corporation. [Last Accessed: Apr. 27, 2006], 1 pg.
Synchronize Milestone dialog box, Microsoft Office Online. Copyright 2006 Microsoft Corporation. [Last Accessed: Apr. 27, 2006], 1 pg.
Tony Apodoca, "Using RenderMan in Animation Production," SIGGRAPH 1995, Course 4, Monday Aug. 7, 1995, 41 pgs.
Taiwan Notice of Allowance in Application 94126264, dated Jun. 10, 2013, 4 pgs.
Taiwan Notice of Allowance in Application 94127756, dated Aug. 23, 2012, 4 pgs.
Taiwan Search Report in Application 094127756, dated Jan. 3, 2012, 1 pg.
The University of Alberta, "PowerPoint Basics", pp. 1 and 7. obtained online on Mar. 6, 2008 at: http://web.archive.org/web/20050207083815/http://www.quasar.ualberta.ca/edpy202/tutorial/PowerPointIpptBasics/pptBasics.htm, 17 pgs.
Top tips for Excel: Charts and graphics, Microsoft Office Online. Copyright 2006 Microsoft Corporation. [Last Accessed: Apr. 27, 2006], 2 pgs.
Troubleshoot charts, Microsoft Office Online. Copyright 2006 Microsoft Corporation. [Last Accessed: Apr. 27, 2006], 11 pgs.
Troubleshoot OLAP cubes, Microsoft Office Online. Copyright 2006 Microsoft Corporation. [Last Accessed: Apr. 27, 2006], 3 pgs.
Troubleshoot PivotChart reports, Microsoft Office Online. Copyright 2006 Microsoft Corporation. [Last Accessed: Apr. 27, 2006], 7 pgs.
Troubleshoot PivotTable reports, Microsoft Office Online. Copyright 2006 Microsoft Corporation. [Last Accessed: Apr. 27, 2006], 7 pgs.
U.S. Appl. No. 09/578,574, Office Action dated Oct. 23, 2001, 16 pgs.

(56) References Cited

OTHER PUBLICATIONS

U.S. Appl. No. 10/955,271, Advisory Action dated Jan. 9, 2007, 3 pgs.
U.S. Appl. No. 10/957,103, Advisory Action dated Jan. 17, 2008, 3 pgs.
U.S. Appl. No. 10/957,103, Amendment and Response filed Jan. 23, 2008, 19 pgs.
U.S. Appl. No. 10/957,103, Amendment and Response filed Nov. 18, 2009, 28 pgs.
U.S. Appl. No. 10/957,103, Amendment and Response filed Nov. 23, 2010, 23 pgs.
U.S. Appl. No. 10/957,103, Amendment and Response filed Dec. 12, 2008, 17 pgs.
U.S. Appl. No. 10/957,103, Amendment and Response filed Dec. 14, 2012, 14 pgs.
U.S. Appl. No. 10/957,103, Amendment and Response filed Dec. 26, 2007, 18 pgs.
U.S. Appl. No. 10/957,103, Amendment and Response filed Mar. 22, 2013, 16 pgs.
U.S. Appl. No. 10/957,103, Amendment and Response filed Apr. 14, 2009, 24 pgs.
U.S. Appl. No. 10/957,103, Amendment and Response filed May 3, 2013, 3 pgs.
U.S. Appl. No. 10/957,103, Amendment and Response filed Jun. 15, 2010, 24 pgs.
U.S. Appl. No. 10/957,103, Amendment and Response filed Jun. 17, 2008, 16 pgs.
U.S. Appl. No. 10/957,103, Amendment and Response filed Jun. 22, 2012, 28 pgs.
U.S. Appl. No. 10/957,103, Amendment and Response filed Jul. 8, 2011, 21 pgs.
U.S. Appl. No. 10/957,103, Amendment and Response filed Aug. 16, 2007, 17 pgs.
U.S. Appl. No. 10/957,103, Amendment filed Jan. 27, 2012, 26 pgs.
U.S. Appl. No. 10/957,103, Final Office Action dated Sep. 27, 2011, 19 pgs.
U.S. Appl. No. 10/957,103, Notice of Allowance dated Oct. 5, 2012, 5 pgs.
U.S. Appl. No. 10/957,103, Notice of Allowance dated Apr. 11, 2013, 7 pgs.
U.S. Appl. No. 10/957,103, Office Action dated Jan. 3, 2013, 7 pgs.
U.S. Appl. No. 10/957,103, Office Action dated Feb. 22, 2012, 19 pgs.
U.S. Appl. No. 10/957,103, Office Action dated Apr. 13, 2011, 19 pgs.
U.S. Appl. No. 11/013,630, Office Action dated Jan. 22, 2008, 2 pgs.
U.S. Appl. No. 11/013,630, Petition dated Mar. 17, 2008, 2 pgs.
U.S. Appl. No. 11/013,630, Petition Decision dated Mar. 18, 2008, 1 page.
U.S. Appl. No. 11/013,630, Petition Decision dated Jul. 21, 2008, 1 page.
U.S. Appl. No. 11/013,655, Amendment and Response filed Jan. 24, 2011, 16 pgs.
U.S. Appl. No. 11/013,655, Amendment and Response filed Oct. 14, 2008, 14 pgs.
U.S. Appl. No. 11/013,655, Amendment and Response filed Nov. 18, 2009, 15 pgs.
U.S. Appl. No. 11/013,655, Amendment and Response filed May 11, 2009, 17 pgs.
U.S. Appl. No. 11/013,655, Amendment and Response filed Aug. 11, 2008, 13 pgs.
U.S. Appl. No. 11/013,655, Amendment and Response filed Aug. 24, 2010, 21 pgs.
U.S. Appl. No. 11/013,655, Notice of Allowance dated Jan. 7, 2011, 5 pgs.
U.S. Appl. No. 11/013,655, Office Action dated Oct. 25, 2010, 15 pgs.
U.S. Appl. No. 11/081,323, Advisory Action dated Sep. 18, 2007, 3 pgs.
U.S. Appl. No. 11/081,324, Examiner's Amendment Communication dated Aug. 12, 2009, 2 pgs.
U.S. Appl. No. 11/081,324, Examiner's Amendment Communication dated Aug. 4, 2009, 2 pgs.
U.S. Appl. No. 11/081,324, Examiner's Amendment Communication dated Sep. 11, 2009, 2 pgs.
U.S. Appl. No. 11/081,324, Petition dated Oct. 5, 2009, 1 page.
U.S. Appl. No. 11/351,341, Amendment and Response filed Oct. 19, 2009, 14 pgs.
U.S. Appl. No. 11/351,341, Amendment and Response filed Dec. 12, 2012, 9 pgs.
U.S. Appl. No. 11/351,341, Amendment and Response filed Mar. 2, 2011, 11 pgs.
U.S. Appl. No. 11/351,341, Amendment and Response filed Apr. 14, 2009, 18 pgs.
U.S. Appl. No. 11/351,341, Amendment and Response filed Jul. 2, 2012, 21 pgs.
U.S. Appl. No. 11/351,341, Amendment and Response filed Jul. 7, 2010, 17 pgs.
U.S. Appl. No. 11/351,341, Amendment and Response filed Sep. 12, 2011, 16 pgs.
U.S. Appl. No. 11/351,341, Notice of Allowance dated Jan. 2, 2013, 22 pgs.
U.S. Appl. No. 11/351,341, Notice of Allowance dated Oct. 22, 2012, 21 pgs.
U.S. Appl. No. 11/351,341, Office Action dated Jan. 7, 2010, 32 pgs.
U.S. Appl. No. 11/351,341, Office Action dated Feb. 3, 2012, 34 pgs.
U.S. Appl. No. 11/351,341, Office Action dated Mar. 20, 2008, 18 pgs.
U.S. Appl. No. 11/351,341, Office Action dated May 12, 2011, 25 pgs.
U.S. Appl. No. 11/351,341, Office Action dated Aug. 7, 2009, 24 pgs.
U.S. Appl. No. 11/351,341, Office Action dated Sep. 2, 2010, 32 pgs.
U.S. Appl. No. 12/035,878, Amendment and Response filed Jan. 28, 2011, 14 pgs.
U.S. Appl. No. 12/035,878, Amendment and Response filed Nov. 28, 2011, 15 pgs.
U.S. Appl. No. 12/035,878, Amendment and Response filed Feb. 21, 2013, 14 pgs.
U.S. Appl. No. 12/035,878, Amendment and Response filed Apr. 26, 2012, 14 pgs.
U.S. Appl. No. 12/035,878, Amendment and Response filed Jul. 14, 2011, 14 pgs.
U.S. Appl. No. 12/035,878, Amendment and Response filed Aug. 21, 2012, 15 pgs.
U.S. Appl. No. 12/035,878, Amendment and Response filed Sep. 5, 2013, 14 pgs.
U.S. Appl. No. 12/035,878, Final Office Action dated 11/26/12, 32 pgs.
U.S. Appl. No. 12/035,878, Final Office Action dated Apr. 14, 2011, 28 pgs.
U.S. Appl. No. 12/035,878, Office Action dated Jan. 27, 2012, 27 pgs.
U.S. Appl. No. 12/035,878, Office Action dated Oct. 28, 2010, 30 pgs.
U.S. Appl. No. 12/035,878, Office Action dated Nov. 8, 2013, 35 pgs.
U.S. Appl. No. 12/035,878, Office Action dated May 15, 2012, 37 pgs.
U.S. Appl. No. 12/035,878, Office Action dated May 28, 2013, 31 pgs.
U.S. Appl. No. 12/035,878, Office Action dated Aug. 26, 2011, 27 pgs.
U.S. Appl. No. 12/723,127, Amendment and Response filed Nov. 6, 2012, 14 pgs.
U.S. Appl. No. 12/723,127, Amendment and Response filed Jun. 26, 2012, 17 pgs.
U.S. Appl. No. 12/723,127, Notice of Allowance dated Dec. 17, 2013, 11 pgs.

(56) References Cited

OTHER PUBLICATIONS

U.S. Appl. No. 12/723,127, Notice of Allowance dated Aug. 8, 2013, 9 pgs.
U.S. Appl. No. 12/723,127, Office Action dated Feb. 27, 2012, 19 pgs.
U.S. Appl. No. 12/723,127, Office Action dated Aug. 6, 2012, 23 pgs.
U.S. Appl. No. 13/362,879, Notice of Allowance dated May 14, 2012, 5 pgs.
U.S. Appl. No. 10/955,271 Office Action dated Apr. 17, 2007, 16 pgs.
U.S. Appl. No. 10/955,271, Amendment and Response filed Jan. 16, 2007, 12 pgs.
U.S. Appl. No. 10/955,271, Amendment and Response filed Dec. 4, 2006, 14 pgs.
U.S. Appl. No. 10/955,271, Amendment and Response filed Jul. 24, 2006, 13 pgs.
U.S. Appl. No. 10/955,271, Amendment and Response filed Jul. 31, 2007, 16 pgs.
U.S. Appl. No. 10/955,271, Notice of Allowance dated Oct. 12, 2007, 7 pgs.
U.S. Appl. No. 10/955,271, Notice of Allowance dated Dec. 14, 2007, 12 pgs.
U.S. Appl. No. 10/955,271, Office Action dated Apr. 20, 2006, 10 pgs.
U.S. Appl. No. 10/955,271, Office Action dated Oct. 3, 2006, 12 pgs.
U.S. Appl. No. 10/957,103, Office Action dated Feb. 18, 2010, 18 pgs.
U.S. Appl. No. 10/957,103, Office Action dated Jul. 21, 2009, 24 pgs.
U.S. Appl. No. 10/957,103, Final Office Action dated Aug. 31, 2010, 19 pp.
U.S. Appl. No. 10/957,103, Office Action dated Jan. 14, 2009, 22 pgs.
U.S. Appl. No. 10/957,103, Office Action dated Mar. 19, 2008, 20 pgs.
U.S. Appl. No. 10/957,103, Office Action dated May 16, 2007, 16 pgs.
U.S. Appl. No. 10/957,103, Office Action dated Oct. 23, 2007, 25 pgs.
U.S. Appl. No. 10/957,103, Office Action dated Sep. 12, 2008, 25 pgs.
U.S. Appl. No. 11/013,630, Amendment and Response filed Jan. 31, 2007, 13 pgs.
U.S. Appl. No. 11/013,630, Notice of Allowance dated Mar. 16, 2007, 7 pgs.
U.S. Appl. No. 11/013,630, Notice of Allowance dated Jul. 26, 2007, 4 pgs.
U.S. Appl. No. 11/013,630, Office Action dated Oct. 31, 2006, 10 pgs.
U.S. Appl. No. 11/013,655, Notice of Allowance dated Jan. 17, 2012, 5 pgs.
U.S. Appl. No. 11/013,655, Notice of Allowance dated Jan. 30, 2012, 2 pgs.
U.S. Appl. No. 11/013,655, Office Action dated Apr. 9, 2008, 18 pgs.
U.S. Appl. No. 11/013,655, Office Action dated Aug. 19, 2009, 20 pgs.
U.S. Appl. No. 11/013,655, Office Action dated Jan. 9, 2009, 16 pgs.
U.S. Appl. No. 11/013,655, Office Action dated May 25, 2010, 31 pgs.
U.S. Appl. No. 11/081,323, Advisory Action dated Oct. 31, 2008, 3 pgs.
U.S. Appl. No. 11/081,323, Amendment and Response filed Oct. 29, 2007, 11 pgs.
U.S. Appl. No. 11/081,323, Amendment and Response filed Apr. 20, 2007, 14 pgs.
U.S. Appl. No. 11/081,323, Amendment and Response filed Apr. 23, 2008, 11 pgs.
U.S. Appl. No. 11/081,323, Amendment and Response filed May 18, 2009, 13 pgs.
U.S. Appl. No. 11/081,323, Amendment and Response filed Sep. 18, 2008, 13 pgs.
U.S. Appl. No. 11/081,323, Amendment and Response filed Sep. 6, 2007, 12 pgs.
U.S. Appl. No. 11/081,323, Notice of Allowance dated Dec. 1, 2009, 4 pgs.
U.S. Appl. No. 11/081,323, Notice of Allowance dated Dec. 16, 2009, 4 pgs.
U.S. Appl. No. 11/081,323, Notice of Allowance dated Feb. 23, 2010, 4 pgs.
U.S. Appl. No. 11/081,323, Notice of Allowance dated Aug. 13, 2009, 6 pgs.
U.S. Appl. No. 11/081,323, Notice of Allowance dated Sep. 18, 2009, 2 pgs.
U.S. Appl. No. 11/081,323, Office Action dated Jan. 23, 2008, 9 pgs.
U.S. Appl. No. 11/081,323, Office Action dated Feb. 18, 2009, 12 pgs.
U.S. Appl. No. 11/081,323, Office Action dated Jan. 22, 2007, 10 pgs.
U.S. Appl. No. 11/081,323, Office Action dated Jul. 18, 2008, 13 pgs.
U.S. Appl. No. 11/081,323, Office Action dated Jul. 6, 2007, 11 pgs.
U.S. Appl. No. 11/081,324, Advisory Action dated Jan. 29, 2009, 3 pgs.
U.S. Appl. No. 11/081,324, Advisory Action dated Feb. 29, 2008, 3 pgs.
U.S. Appl. No. 11/081,324, Amendment and Response dated Jan. 26, 2009, 17 pgs.
U.S. Appl. No. 11/081,324, Amendment and Response dated Feb. 11, 2008, 15 pgs.
U.S. Appl. No. 11/081,324, Amendment and Response dated Sep. 12, 2008, 15 pgs.
U.S. Appl. No. 11/081,324, Amendment and Response dated Sep. 28, 2007, 16 pgs.
U.S. Appl. No. 11/081,324, Notice of Allowance dated Nov. 30, 2009, 6 pgs.
U.S. Appl. No. 11/081,324, Notice of Allowance dated Mar. 5, 2010, 6 pgs.
U.S. Appl. No. 11/081,324, Notice of Allowance dated Jun. 10, 2009, 12 pgs.
U.S. Appl. No. 11/081,324, Office Action dated Dec. 11, 2007, 15 pgs.
U.S. Appl. No. 11/081,324, Office Action dated Jun. 29, 2007, 16 pgs.
U.S. Appl. No. 11/081,324, Office Action dated May 12, 2008, 15 pgs.
U.S. Appl. No. 11/081,324, Office Action dated Nov. 26, 2008, 18 pgs.
U.S. Appl. No. 11/172,279, Advisory Action dated Oct. 24, 2008, 3 pgs.
U.S. Appl. No. 11/172,279, Advisory Action dated Aug. 23, 2007, 3 pgs.
U.S. Appl. No. 11/172,279, Amendment and Response dated Jan. 11, 2010, 21 pgs.
U.S. Appl. No. 11/172,279, Amendment and Response dated Oct. 16, 2008, 14 pgs.
U.S. Appl. No. 11/172,279, Amendment and Response dated Nov. 19, 2007, 9 pgs.
U.S. Appl. No. 11/172,279, Amendment and Response dated Feb. 18, 2009, 14 pgs.
U.S. Appl. No. 11/172,279, Amendment and Response dated Feb. 27, 2007, 12 pgs.
U.S. Appl. No. 11/172,279, Amendment and Response dated Jun. 6, 2008, 11 pgs.
U.S. Appl. No. 11/172,279, Amendment and Response dated Jul. 28, 2009, 21 pgs.
U.S. Appl. No. 11/172,279, Amendment and Response dated Aug. 17, 2007, 9 pgs.
U.S. Appl. No. 11/172,279, Final Office Action dated Aug. 19, 2008, 11 pgs.

(56) References Cited

OTHER PUBLICATIONS

U.S. Appl. No. 11/172,279, Final Office Action dated May 17, 2007, 13 pgs.
U.S. Appl. No. 11/172,279, Notice of Allowance dated Apr. 2, 2010, 8 pgs.
U.S. Appl. No. 11/172,279, Office Action dated Apr. 29, 2009, 13 pgs.
U.S. Appl. No. 11/172,279, Office Action dated Mar. 6, 2008, 11 pgs.
U.S. Appl. No. 11/172,279, Office Action dated Nov. 12, 2009, 19 pgs.
U.S. Appl. No. 11/172,279, Office Action dated Nov. 27, 2006, 11 pgs.
Using charts and diagrams in the classroom, Microsoft Office Online. Copyright 2006 Microsoft Corporation. [Last Accessed: Apr. 27, 2006], 5 pgs.
Using Excel 2003 with earlier versions of Excel, Microsoft Office Online. Copyright 2006 Microsoft Corporation. [Last Accessed: Apr. 27, 2006], 4 pgs.
V.I. Arnold et al., "Ergodic Problems of Classical Mechanics," W.A. Benjamin, Inc., pp. v-ix & pp. 1-51.
Visio 2003 Bible, Chapter 10 (pp. 187-202), Chapter 12 (pp. 223-238), Chapter 13 (pp. 239-252) and Chapter 14 (pp. 253-270), copyright 2004 by Wiley Publishing Company (cited in email communication from European Examiner on May 12, 2011 in European Application 05105366.8); 69 pgs.
Where is the Chart menu?, Microsoft Office Online. Copyright 2006 Microsoft Corporation. [Last Accessed: Apr. 27, 2006], 1 pg.
Word Windows XP 2003, Microsoft Office 2003 Edition, no English translation, 10 pgs.
Work with Visio UML model diagrams in Visual Studio .NET', Microsoft Office Online. Copyright 2006 Microsoft Corporation. [Last Accessed: Apr. 27, 2006), 1 pg.
Y. Xu et al., "Chaos-Based Texture Synthesis," Visual Computing Group, Microsoft Research China, pp. 1-9.
YEd Graph Editor—Published Date: 2009; New yEd version 3.4.1, http://www.yworks.com/en/products_yed_about.html, 5 pgs.
Young, Michael J., "Microsoft Office System Inside Out"—2003 Edition, Michael Halvorson, 2003, p. 267.
Canadian Examiner's Report in Application 2517399, dated Nov. 29, 2013, 4 pgs.
Malaysian Notice of Allowance in Application PI 20054064, dated Oct. 31, 2013, 2 pgs.
Eunsoon Choi, "A Study on Instruction for Statistics & Probability through Excel Utilization" published on Aug. 2002 as a master's thesis submitted to the graduate school of education, no English translation available, Silla University, Korea, 75 pgs.
Korean Notice of Preliminary Rejection in Application (with English translation), in Application 10-2005-73848, dated Nov. 18, 2013, 8 pgs.
Malaysian Notice of Allowance in Application PI 20054063, dated Jul. 15, 2013, 2 pgs.
U.S. Appl. No. 12/035,878, Amendment and Response filed Feb. 10, 2014, 15 pgs.
U.S. Appl. No. 12/035,878, Notice of Allowance dated Mar. 14, 2014, 10 pgs.
U.S. Appl. No. 12/723,127, Notice of Allowance mailed Feb. 28, 2014, 8 pgs.
Chinese Notice of Allowance in Application 201010587370.1, dated Feb. 13, 2014, 4 pgs.
Russian Notice of Allowance in Application 2010100807, dated Jan. 31, 2014, 6 pgs.
U.S. Appl. No. 12/035,878, Amendment filed Apr. 22, 2014, 3 pgs.
U.S. Appl. No. 12/723,127, Amendment filed Apr. 22, 2014, 1 pg.
Canadian Notice of Allowance in Application 2517399, dated Sep. 5, 2014, 2 pgs.
Indian Office Action in Application 2284/DEL/2005, dated Feb. 17, 2015, 2 pgs.
U.S. Appl. No. 13/621,614, Office Action dated Jun. 26, 2015, 6 pgs.
U.S. Appl. No. 13/855,386, Office Action dated Jul. 14, 2015, 20 pgs.
"Show Me Microsoft Office Powerpoint 2003" by Steve Johnson, Perspection, Inc., Publisher: Que, Publication Date: Oct. 2, 2003, Print ISBN-10; 0-7897-3009-X, 530 pgs.
U.S. Appl. No. 13/621,614, Amendment and Response filed Sep. 28, 2015, 9 pgs.
U.S. Appl. No. 13/855,386, Amendment and Response filed Oct. 14, 2015, 12 pgs.
U.S. Appl. No. 14/296,023, Office Action dated Dec. 10, 2015, 13 pgs.
U.S. Appl. No. 13/933,390, Office Action dated Feb. 2, 2016, 13 pgs.
U.S. Appl. No. 13/621,614, Office Action dated Jan. 29, 2016, 4 pgs.
U.S. Appl. No. 14/296,023, Amendment and Response filed Mar. 10, 2016, 14 pgs.
U.S. Appl. No. 13/855,386, Office Action dated Mar. 21, 2016, 12 pgs.
U.S. Appl. No. 13/621,614, Amendment and Response filed Apr. 14, 2016, 9 pgs.
U.S. Appl. No. 13/933,390, Amendment and Response filed May 2, 2016, 20 pgs.
U.S. Appl. No. 13/621,614, Notice of Allowance dated May 23, 2016, 5 pgs.
U.S. Appl. No. 13/933,390, Notice of Allowance dated Jun. 21, 2016, 7 pgs.
U.S. Appl. No. 14/296,023, Notice of Allowance dated Jun. 22, 2016, 8 pgs.
U.S. Appl. No. 13/855,386, Amendment and Response filed Jun. 21, 2016, 12 pgs.
U.S. Appl. No. 14/296,023, Amendment and Response filed Aug. 29, 2016, 9 pgs.
U.S. Appl. No. 13/855,386, Notice of Allowance dated Aug. 12, 2016, 11 pgs.
Wenwen, D. et al., "Hierarchical Topics: Visually Exploring Large Text Collections Using Topic Hierarchies", Dec. 2013, IEEE, vol. 19, No. 12, pp. 2002-2011.
Mighlani, D. et al., "Intelligent Hierarchical Layout Segmentation of Document Images on the Basis of Colour Content", Dec. 1997, IEEE Tencon, pp. 191-194.
U.S. Appl. No. 13/933,390, Amendment after Allowance filed Aug. 4, 2016, 7 pgs.
U.S. Appl. No. 13/933,390, USPTO Response to Amendment dated Aug. 16, 2016, 2 pgs.
U.S. Appl. No. 13/933,390, Amendment after Allowance filed Aug. 26, 2016, 11 pgs.
U.S. Appl. No. 14/296,023, USPTO Response dated Sep. 9, 2016, 2 pgs.
U.S. Appl. No. 13/621,614, Amendment after Allowance filed Aug. 4, 2016, 9 pgs.
U.S. Appl. No. 13/621,614, USPTO Response dated Sep. 2, 2016, 2 pgs.
U.S. Appl. No. 13/855,386, USPTO Response dated Sep. 9, 2016, 2 pgs.
U.S. Appl. No. 13/855,386, Notice of Allowance dated Sep. 22, 2016, 2 pgs.
U.S. Appl. No. 13/621,614, Notice of Allowance dated Dec. 9, 2016, 5 pgs.
U.S. Appl. No. 14/307,668, Office Action dated Dec. 20, 2016, 19 pgs.
Brazil Office Action in Application PI0502558-3, dated Jan. 26, 2017, 7 pgs.
U.S. Appl. No. 13/621,614, Amendment after Allowance filed Jan. 10, 2017, 9 pgs.
U.S. Appl. No. 13/621,614, USPTO Response dated Jan. 20, 2017, 2 pgs.
U.S. Appl. No. 13/855,386, 312 Amendment filed Aug. 26, 2016, 3 pages.
U.S. Appl. No. 14/307,668, Notice of Allowance dated Apr. 25, 2017, 8 pgs.
Indian Office Action in Application 1572/DEL/2005, dated May 31, 2017, 8 pgs.

(56) References Cited

OTHER PUBLICATIONS

Brazilian Office Action in Application PI0503878-2, dated May 29, 2017, 14 pages.
Indian Office Action in Application 0343/DEL/2006, dated May 31, 2017, 11 pages.
Notice Of Allowance Issued in Japanese Patent Application No. 2005-253627, dated Jan. 6, 2012, 4 Pages. (MS# 309693-JP-NP).
Indian Notice of Allowance in Application 2126/DEL/2005, dated Sep. 18, 2017, 1 page. (MS# 309693-IN-NP).
"Final Office Action Issued In U.S. Appl. No. 15/251,175", dated Sep. 17, 2018, 18 Pages.
"Non Final Office Action Issued In U.S. Appl. No. 15/467,065", dated Aug. 3, 2018, 10 Pages.
"Non Final Office Action Issued In U.S. Appl. No. 15/637,606", dated Sep. 26, 2018, 8 Pages.
"Office Action Issued In Indian Patent Application No. 1572/DEL/2005", dated Jun. 15, 2018, 3 Pages.
U.S. Appl. No. 15/251,175, Office Action dated Jan. 31, 2018, 17 pages (MS# 309694-US-DIV).
"Office Action Issued in European Patent Application No. 05108658.5", dated Oct. 20, 2017, 6 Pages. (MS# 309693-EP-EPA).
"Methods for the Automatic Creation of PowerPoint Slides from Tagged Presentation Content", In Journal of IP.com No. IPCOM000022407D, Mar. 12, 2004, 6 Pages.
"Non Final Office Action Issued in U.S. Appl. No. 15/251,175", dated Jun. 12, 2019, 18 Pages. (MS# 309694-US-DIV).
"Office Action Issued in Thailand Patent Application No. 0501003438", dated Feb. 11, 2020, 4 Pages.

* cited by examiner

AUTOMATICALLY CONVERTING TEXT TO BUSINESS GRAPHICS

CROSS-REFERENCE TO RELATED APPLICATIONS

This application is a continuation application of U.S. patent application Ser. No. 13/855,386, entitled "AUTOMATICALLY CONVERTING TEXT TO BUSINESS GRAPHICS," filed on Apr. 2, 2013 (now U.S. Pat. No. 9,529,786), which application is a continuation application of U.S. patent application Ser. No. 11/351,341 (now U.S. Pat. No. 8,438,486), filed on Feb. 9, 2006, the entire disclosures of which are hereby incorporated herein by reference.

TECHNICAL FIELD

The described technology is directed to the field of software applications, and, more particularly, to the field of features for business productivity software applications.

BACKGROUND

Business meetings are often goal-directed, in that they are called for a specific purpose, and an agenda for conducting a meeting is typically defined that satisfies the meeting's purpose. Historically, it has been common for a planner or presenter to distribute paper copies of the agenda, in some cases together with copies of other supporting materials relating to the agenda.

More recently, software applications for preparing presentation documents have become generally available. Such applications make it easy for a typical computer user to construct a multiple-page visual presentation that can be projected and advanced throughout the meeting for viewing by all participants. Such presentations can include information that might have otherwise been provided in a written agenda or accompanying supporting documents, or that might not have been provided at all, such as relevant photographs or video clips. Such presentations can also be used for a variety of other visual subject matter not relating to agendas or meetings.

In general, most presentations generated using such applications are textual outlines of the agenda, which often contain such constructs as lists and outlines. Although it is technically possible to use such applications to generate presentations that present information using more eye-catching business graphics, in practice this capability is seldom used. Failure to use this capability may be explained by the fact that designing such business graphics typically requires both a strong graphical eye and a sense of the different graphical designs which may be used, or by the fact that executing such business graphics typically requires significant drawing talent, time, and patience.

A few software applications enable a user to insert an empty pregenerated business graphic, which the user can edit to add textual content, or add, delete, or rearrange elements of the graphic. Using this functionality, however, can require significant effort on the part of the user, who must manually map text to each element or subelement of the graphic, type this text in the appropriate place, and modify the structure of the graphic to match the structure desired.

SUMMARY

A software facility for automatically converting text to business graphics is described. The facility enables a user to select a body of text in a presentation or other document and invoke a "convert to graphic" command that may be invoked in a variety of ways. In response, the facility displays a gallery of different graphic designs that can be used to convert the selected text into a graphic. When the user chooses a graphic design from the gallery, the facility automatically discerns a structure or organization of the selected body of text, and maps this structure onto a graphic template provided for the graphic design to create a graphic corresponding to the selected text. The facility then replaces the selected text with the created graphic. The user may alter the created graphic in a variety of ways, including selecting a new graphic design for the created graphic, or editing the text on which the created graphic is based.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A software facility for automatically converting text to business graphics ("the facility") is described. In some embodiments, the facility enables a user to select a body of text in a presentation or other document and invoke a "convert to graphic" command that may be invoked in a variety of ways. The selected text may be defined either explicitly or implicitly based upon user input. In response, in some embodiments, the facility displays a gallery of different graphic designs that can be used to convert the selected text into a graphic. When the user chooses a graphic design from the gallery, the facility automatically discerns a structure or organization of the selected body of text, and maps this structure onto a graphic template provided for the graphic design to create a graphic corresponding to the selected text. The facility then replaces the selected text with the created graphic.

In some embodiments, the facility continues to display the body of text on which the created graphic is based, such as in a special floating window. The user can edit the displayed body of text, and have the edits reflected in updated versions of the created graphic that are displayed in place of the created graphic. For example, the user may perform edits to the displayed body of text that have the effect of adding a graphical element to the graphic, removing a graphical element from the graphic, promoting or demoting the level of a graphical element of the graphic, or altering the text shown in a graphical element of the graphic.

In some embodiments, the facility enables the user to choose a new graphic design for an existing graphic. In response, the facility transforms the existing graphic from its prior graphic design to the new graphic design.

By performing in some or all of the ways described above, the facility enables a user without special skills to easily create and revise professional-quality business graphics in a presentation or other document.

Figure 1:
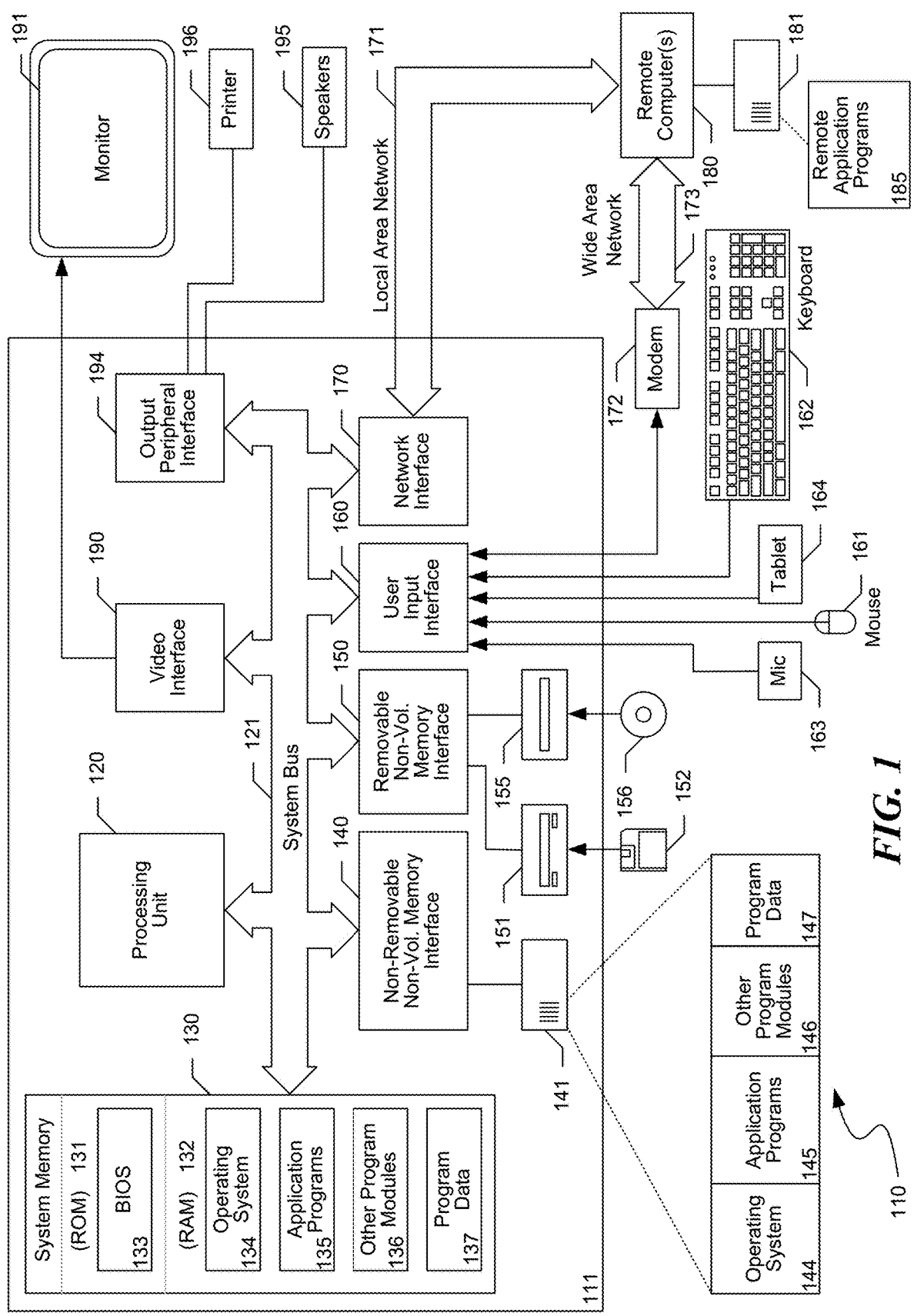
FIG. 1 is a block diagram illustrating an example of a suitable computing system environment or operating environment in which the facility may be implemented.

FIG. 1 is a block diagram illustrating an example of a suitable computing system environment 110 or operating environment in which the facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 111 typically includes a variety of computer-readable media. Computer-readable media can be any available media that can be accessed by the computer 111 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 111 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 111. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 111 is incorporated, such as in a tablet-type personal computer. In addition, computing devices such as the computer 111 may also include other peripheral output devices such as speakers 195 and a printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

In order to more fully describe the facility, its operation in connection with a specific example is discussed below in connection with FIGS. 2-12.

Figure 2:
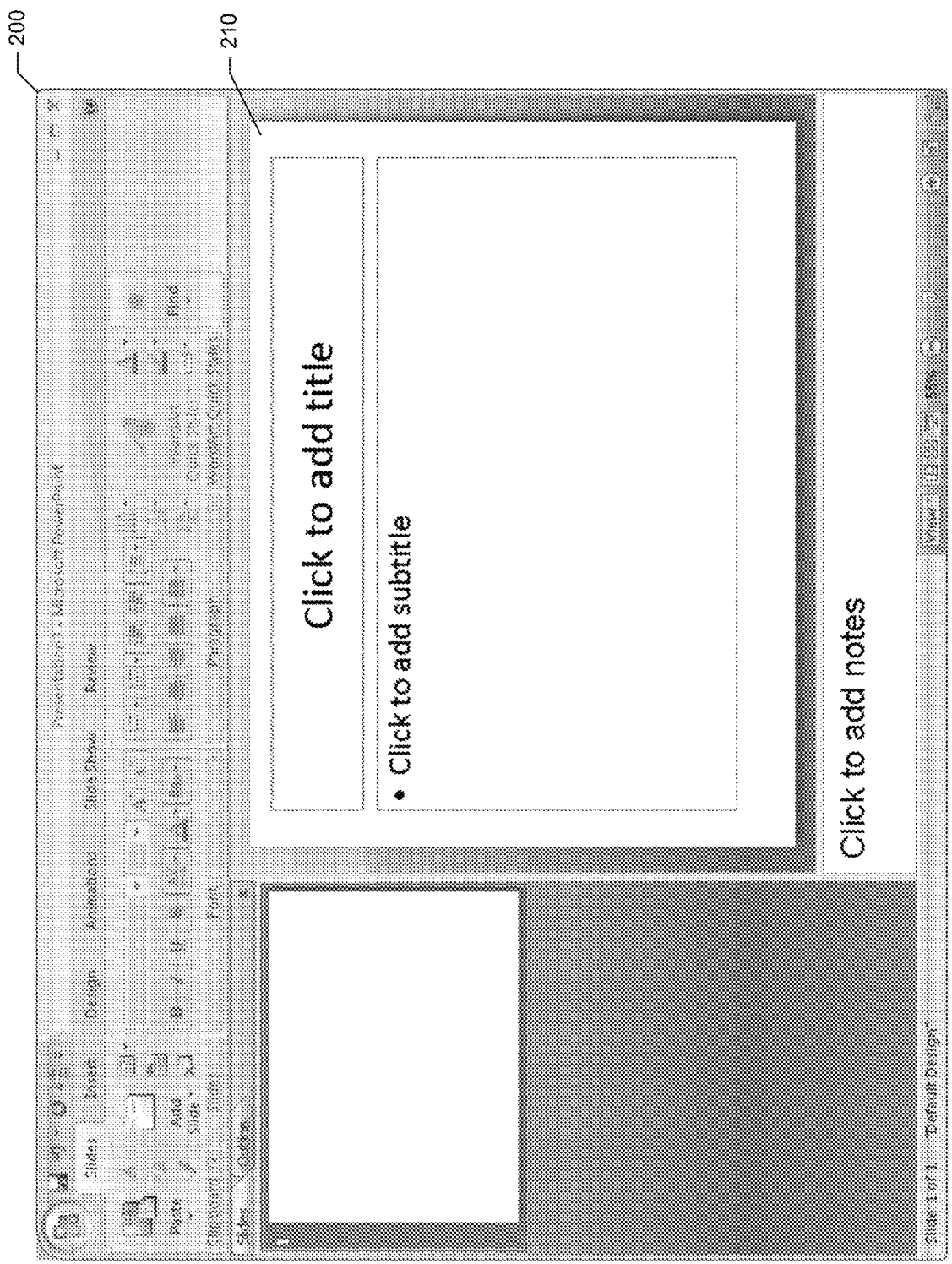
FIG. 2 is a user interface diagram showing in an initial display presented by the facility when used in connection with a presentation application.

FIG. 2 is a user interface diagram showing in an initial display presented by the facility when used in connection with a presentation application. Those skilled in the art will appreciate that the facility may be used in connection with applications of virtually any type that permit a user to enter or load text. The display 200 includes an application window for the presentation application. The application window includes a client area 210, into which the user may type text that is to be included in the presentation.

Figure 3:
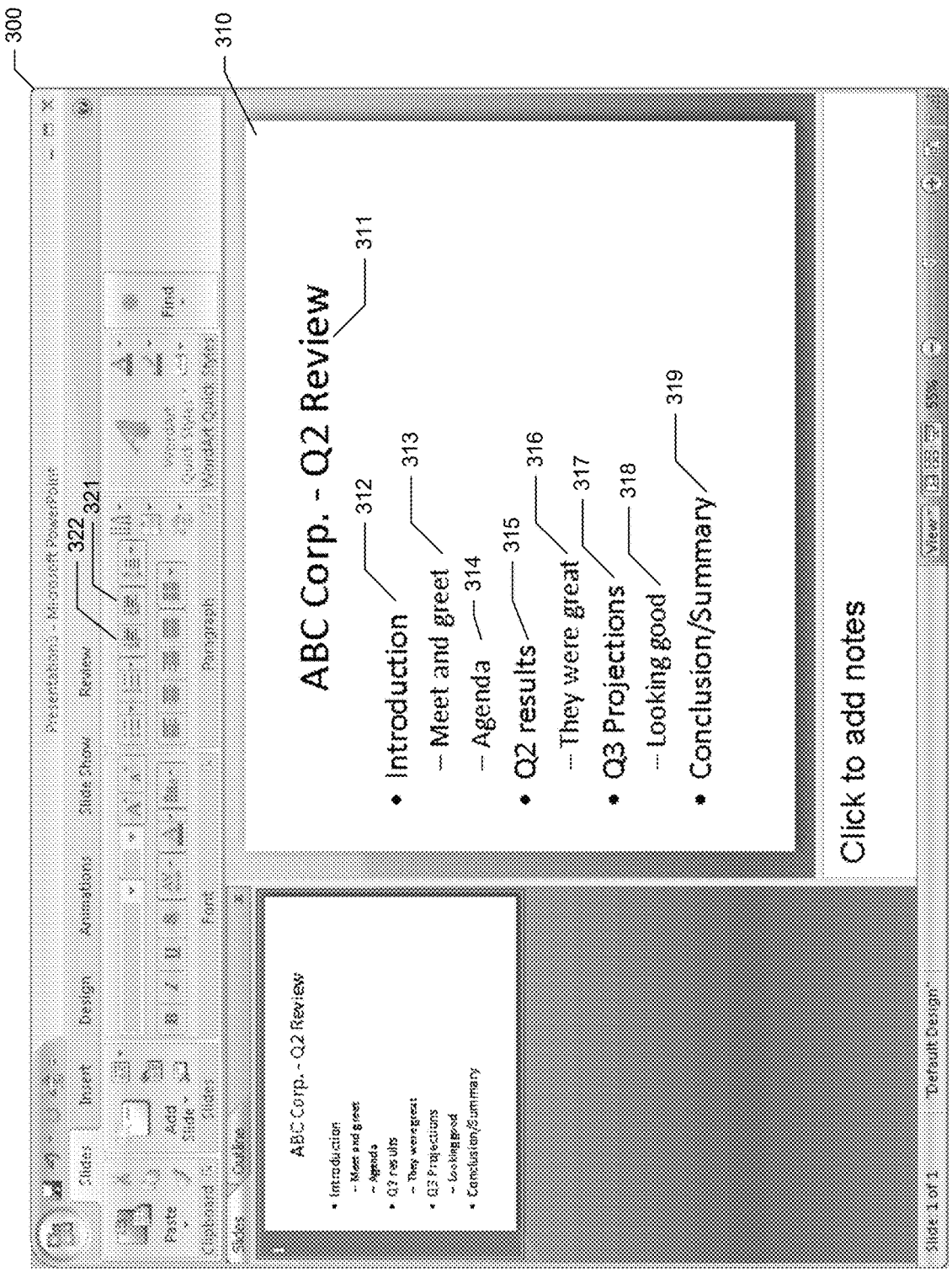
FIG. 3 is a user interface diagram showing a display presented by the facility reflecting textual information entered by the user for inclusion in the presentation.

FIG. 3 is a user interface diagram showing a display presented by the facility reflecting textual information entered by the user for inclusion in the presentation. It can be seen that client area 310 contains text, including a title text line 311, as well as body text lines 312-319. It can further be seen that the body text has been formed both in an order—in that it is clear which text line comes first, second, etc.—and a hierarchy—in that it can be seen that, for example, text lines 313 and 314 are children of text line 312. The user can determine the order of the text lines either based upon the order in which they are entered, or by moving an insertion point to the location in the order where the user wants the next-entered text to appear. The user can specify the hierarchy as follows: if the user wants the next text line to be at the same level of the hierarchy as the present text line, the user merely presses the enter key when at the end of the present text line. If the user wants the next text line to be at a lower level than the present text line, the user presses the enter key, then the tab key at the end of the present text line. If the user wants the next text line to be at a higher level of the hierarchy than the present text line, the user presses the enter key, followed by the back-tab key when at the end of the present text line. The user may also change a text line's level in the hierarchy by selecting the line, then selecting either indent button 321 or outdent button 322. The user may also use a variety of other text editing techniques, such as inserting spaces in front of a text line in order to demote the text line in the hierarchy, or deleting spaces before a text line in order to promote the text line in the hierarchy.

Figure 4:
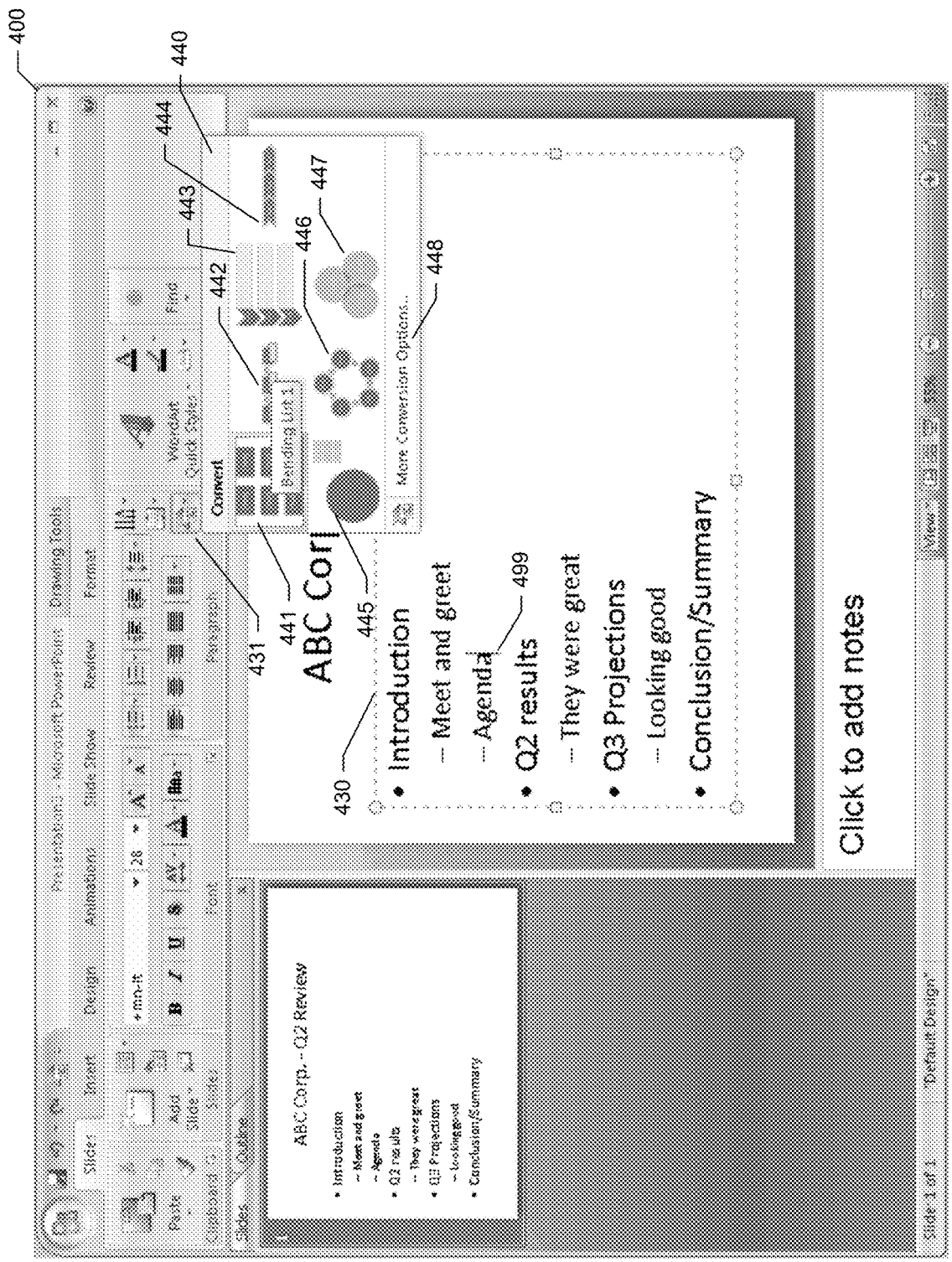
FIG. 4 is a user interface diagram showing a display presented by the facility reflecting the user's selection of a convert to graphic button in the user interface.

FIG. 4 is a user interface diagram showing a display presented by the facility reflecting the user's selection of a convert to graphic button in the user interface. Here, the user has placed a text insertion point 499 inside a text container 430 containing text lines 312-319 shown in FIG. 3. When the user selects convert to graphic button 431 in the ribbon area of the application's user interface, the facility displays a gallery 440 of graphic designs into which the text can be converted. In some embodiments, the graphic designs shown in the gallery are limited to a proper subset expected—such as by their designers—to produce the best results from automatic conversion. In some embodiments, the graphic designs shown in the gallery are ordered in a way that reflects a rank among the shown graphic designs of the extent to which they are expected—such as by their designers—to produce good results in the convert to graphic operation. Here, the gallery includes indicators 441-447, each corresponding to a different graphic design and showing an example of the design's appearance. It can be seen that the user has hovered over graphic design indication 441, causing the facility to display a tool tip containing its name. At this point, the user may either select a graphic design indication from the gallery, or may select control 448 for presenting additional graphic designs that can be used in the conversion.

Figure 5:
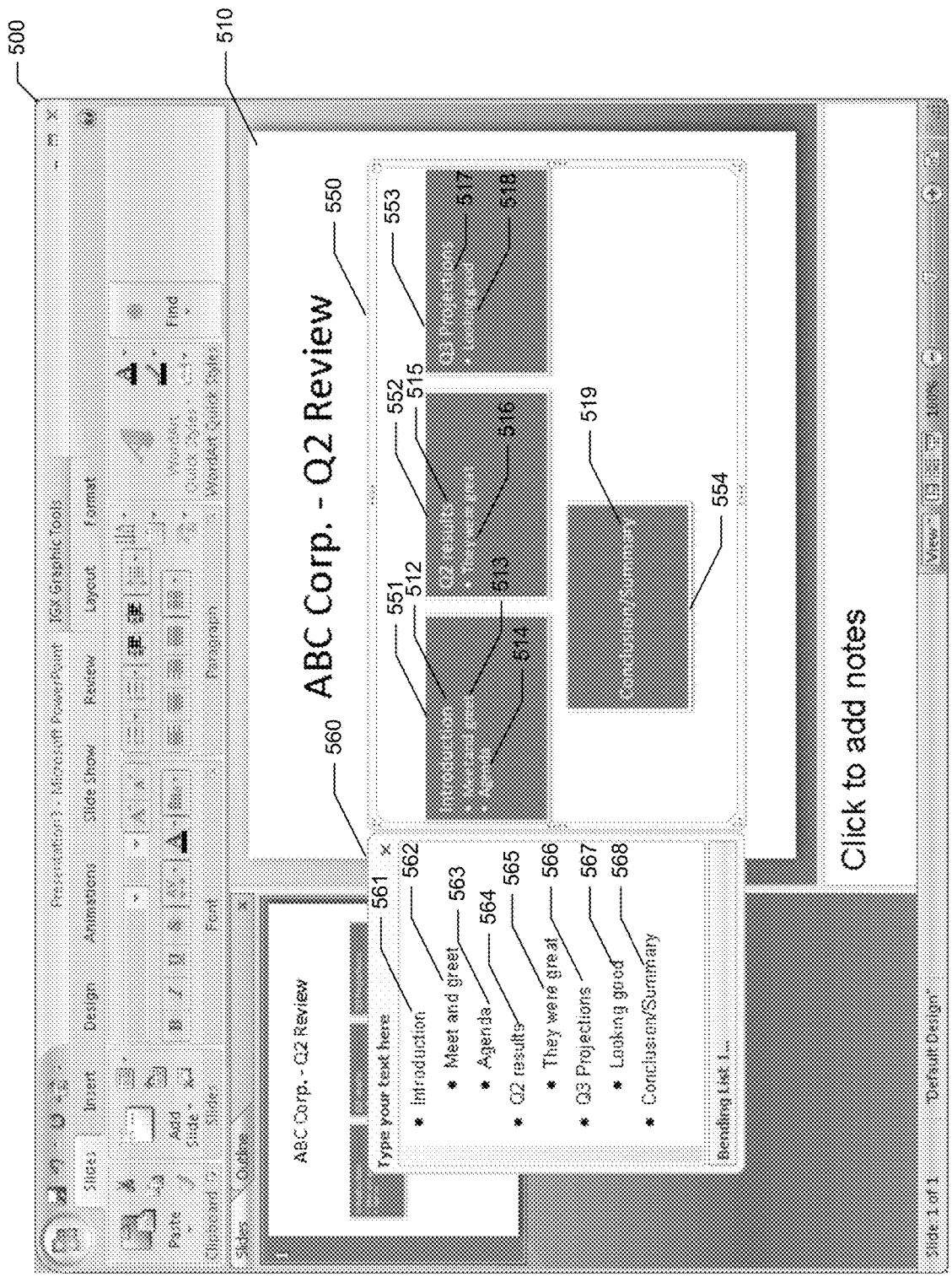
FIG. 5 is a user interface diagram showing a display presented by the facility when the user selects a graphic design indication from the graphic design gallery displayed by the facility.

FIG. 5 is a user interface diagram showing a display presented by the facility when the user selects a graphic design indication from the graphic design gallery displayed by the facility. In particular, where the user selects graphic design indication 441 after placing insertion point 499 in FIG. 4, the facility replaces the selected text with a graphic 550 generated from the text contained in text container 430 using the graphic design corresponding to selected graphic design indication 441. In particular, the graphic has four major elements 551-554, each corresponding to a different one of the four lines of text 312, 315, 317, and 319 at the highest level of the hierarchy. Text from the lower level of the hierarchy is shown in the element corresponding to its parent. For example, lines 313 and 314 appear in element 551. This mapping from levels of the hierarchy to elements and subelements of the graphic design are configurable aspects of the graphic design. The mappings are also extensible, in that, after the facility is shipped to customers, a graphic design containing a new mapping may be added. The facility further displays a floating window 560, containing a copy of the textual hierarchy made up of text lines 560-568, which the user may edit in order to modify the generated graphic.

Figure 6:
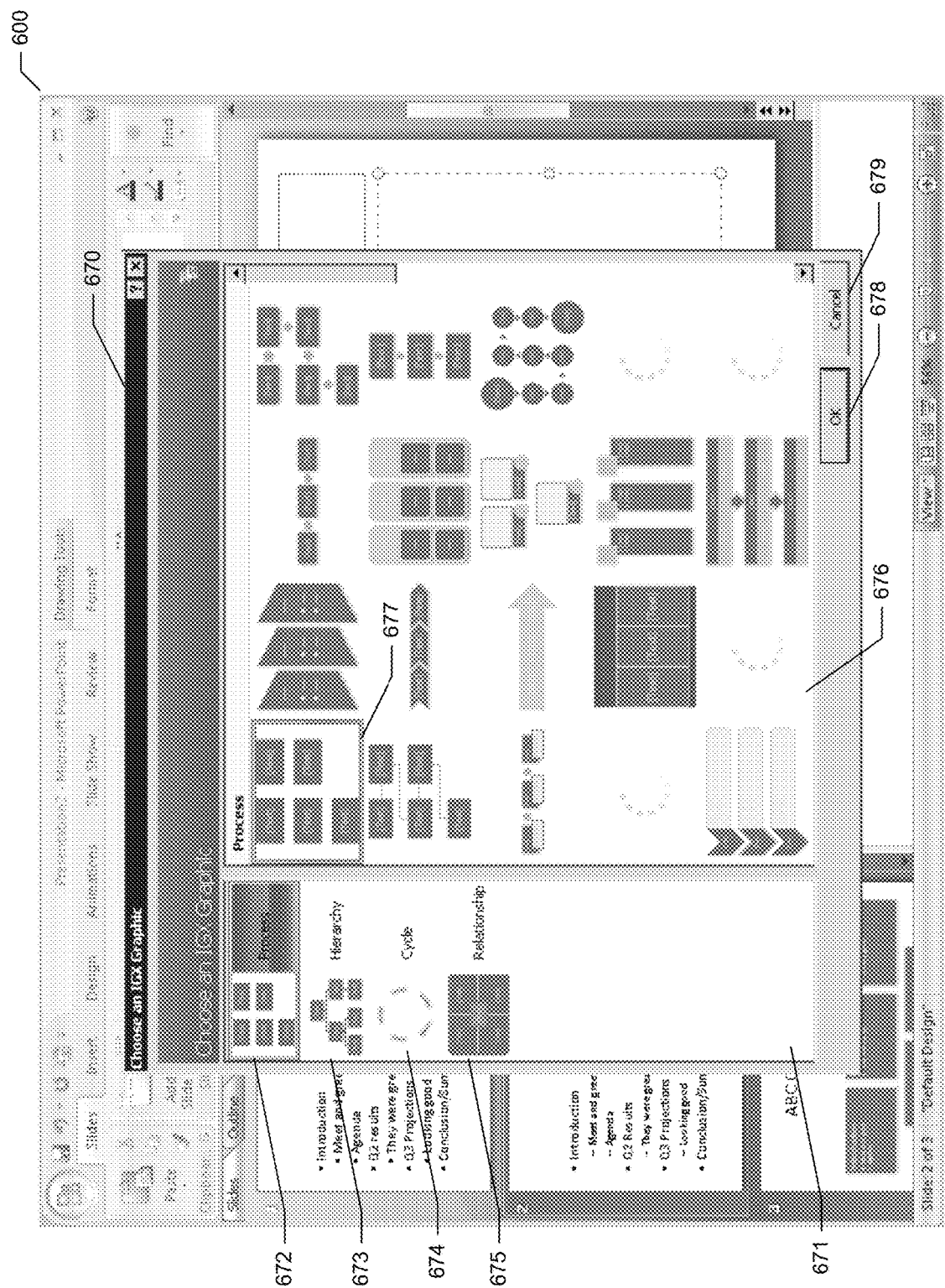
FIG. 6 is a user interface diagram showing a display presented by the facility when the user selects the more conversion options control.

Where, in FIG. 4, the user selects the more conversion options control 448, the facility displays indications of a larger selection of available graphic designs. FIG. 6 is a user interface diagram showing a display presented by the facility when the user selects the more conversion options control. This display includes an extended graphic design gallery 670 which may include graphic designs other than those in the subset determined to be most likely to produce good conversion results. The extended gallery is divided into two panes: a category pane 671 and a graphic design indication pane 676. When the user selects one of the category indications 672-675 displayed in the category pane, the facility displays in the graphic design indication pane indications of a large number of graphic designs belonging to the category. For example, when the user selects indication 672 for the process category, the facility displays a number of indications of process graphic designs, including graphic design indication 677. The user may select one of these graphic design indications, then select an OK control 678 to select the corresponding graphic design. The user may select a cancel control 679 to dismiss the extended gallery.

Figure 7:
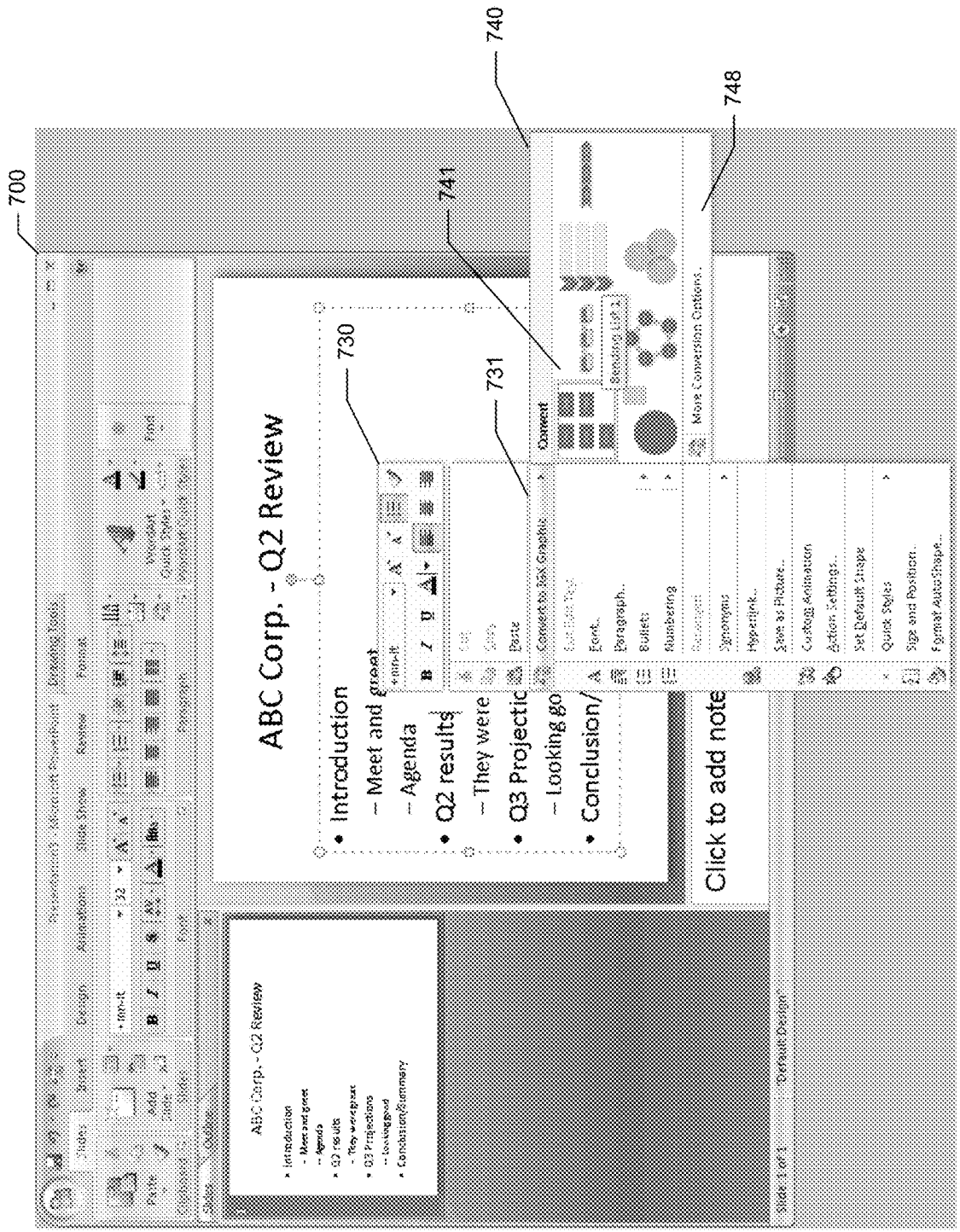
FIG. 7 is a user interface diagram showing a display typically presented by the facility when the user invokes a context menu by right-clicking in the client area.

Rather than using a button as shown in FIG. 4 to issue a convert to graphic command, in some embodiments, the user can use a context menu to issue a convert to graphic command. FIG. 7 is a user interface diagram showing a display typically presented by the facility when the user invokes a context menu by right-clicking in the client area. The context menu 730 includes a variety of controls, including a variety of formatting buttons and menu entries, including a menu entry 731 for the convert to graphic command. When the user selects menu item 731, the facility displays graphic design gallery 740, containing indications of various graphic designs available for the conversion process including indication 741. The gallery further includes a more conversion options control 748 that the user may select in order to display an extended gallery containing indications for a larger number of available graphic designs.

Figure 8:
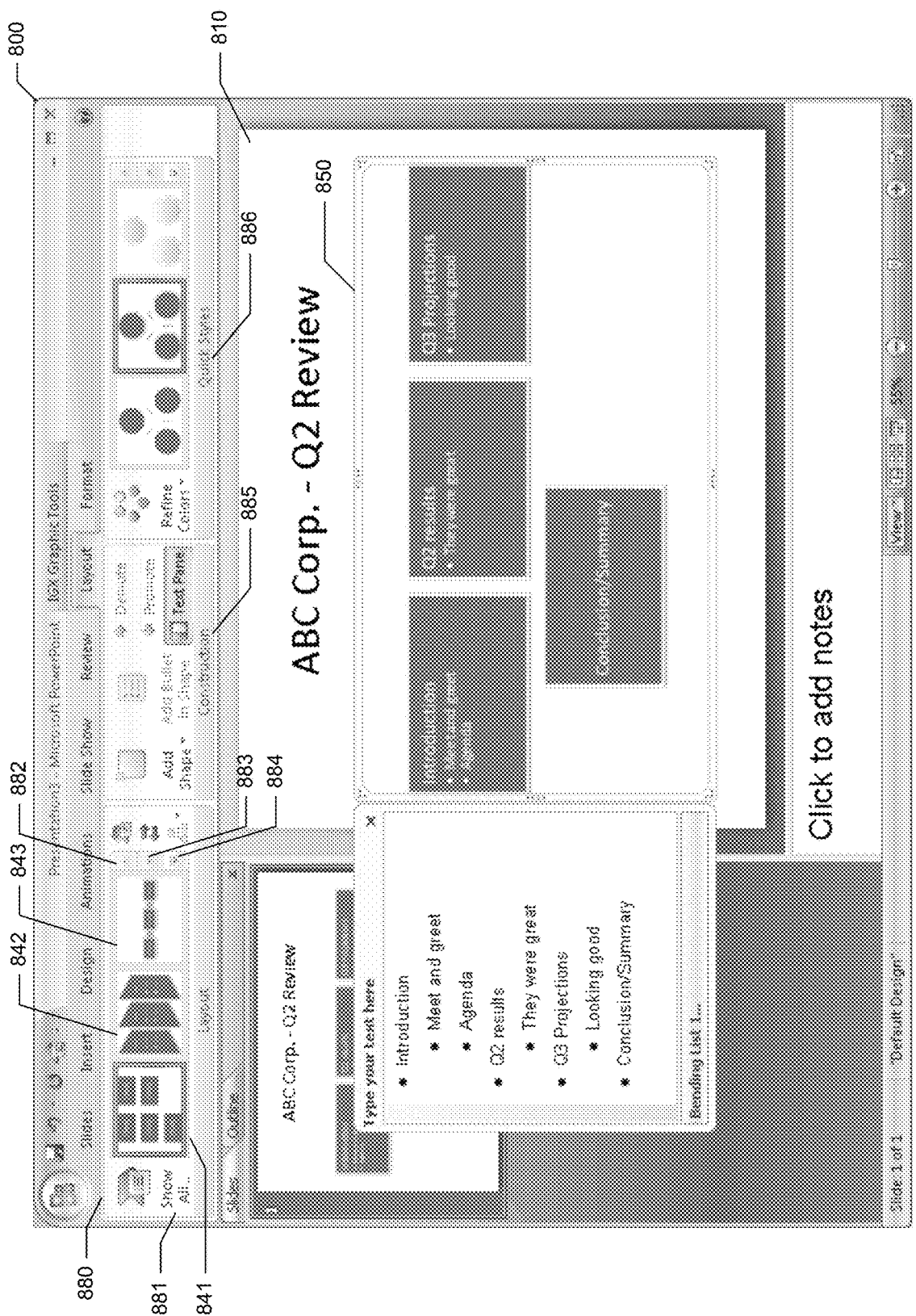
FIG. 8 is a user interface diagram showing a display typically presented by the facility when the user selects a graphic design indication from a graphic design gallery displayed by the facility when the user selects a convert to graphic entry from a context menu.

If the user selects indication 741, then the facility proceeds to generate a graphic based on the text hierarchy using the graphic design corresponding to graphic design indication 741. FIG. 8 is a user interface diagram showing a display typically presented by the facility when the user selects a graphic design indication from a graphic design gallery displayed by the facility when the user selects a convert to graphic entry from a context menu. The presentation document 810 similar to the one shown in FIG. 5, including a substituted graphic 850 similar to substituted graphic 550. In addition, the facility displays a variety of controls relating to the conversion operation. A layout portion of the ribbon 880 includes a limited gallery of graphic design indications, such as indications 841-843. The user may select one of these to change the graphic design used for the graphic produced by the conversion operation, or may use scroll controls 882-883 to scroll through the indications of the available graphic designs displayed in positions 841-843. The user may also select a show all control 881 to display a complete gallery of graphic design indications as shown in FIG. 6, or select a show whole category control 884 to display a gallery of graphic design indications from the same graphic design category as currently-selected graphic design 841. The ribbon area also includes a construction section 885 containing controls for modifying the graphic, and a quick style section 886 for applying various coloring, shading, and effects styles to the generated graphic.

Figure 9:
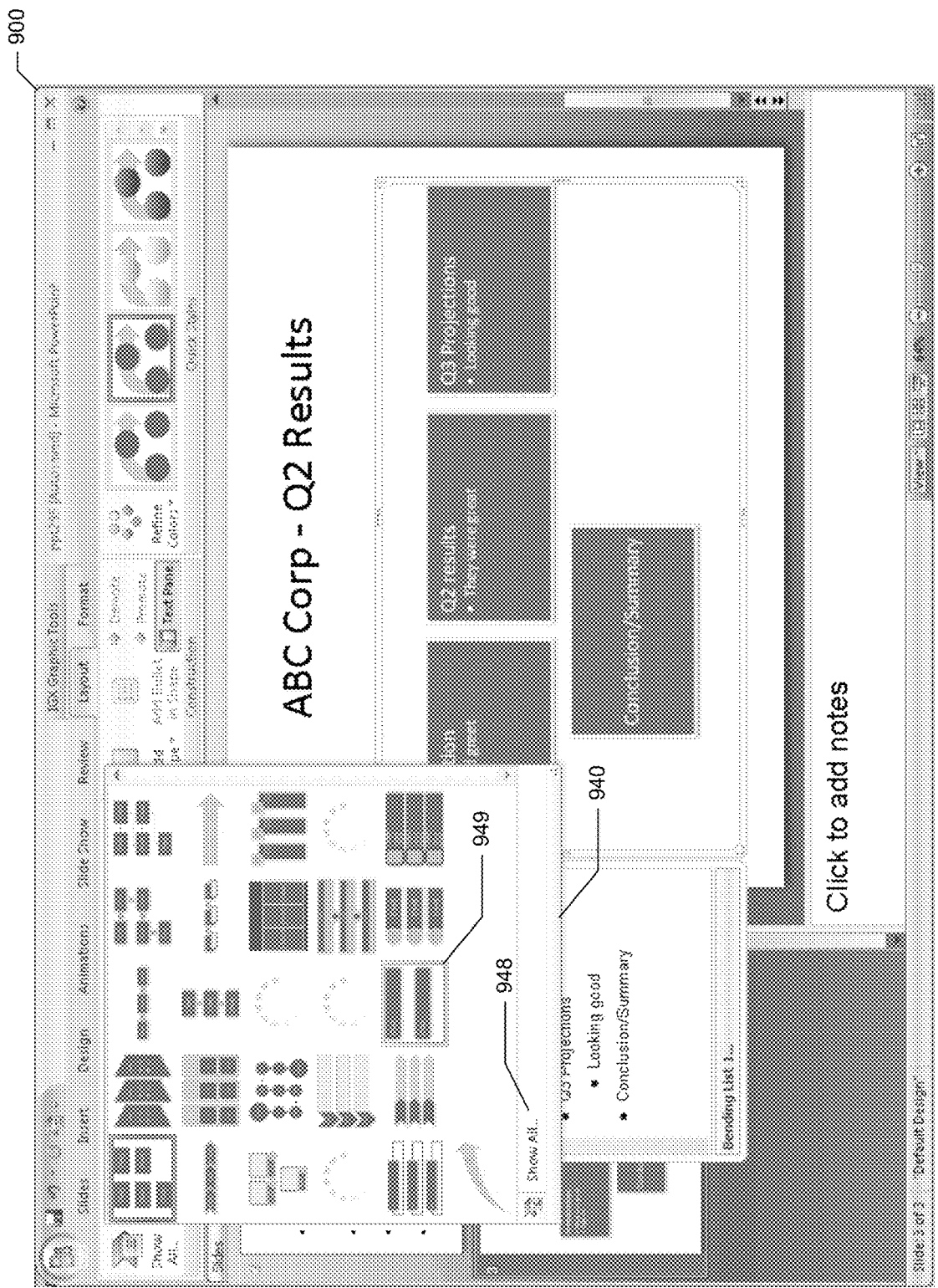
FIG. 9 is a user interface diagram showing a display typically presented by the facility when the user selects the show whole category control.

FIG. 9 is a user interface diagram showing a display typically presented by the facility when the user selects the show whole category control. The display includes a larger gallery 940 of graphic design indications, including graphic design indication 949. The user can select any of these graphic design indications to change the graphic generated by the conversion operation to the new graphic design.

Figure 10:
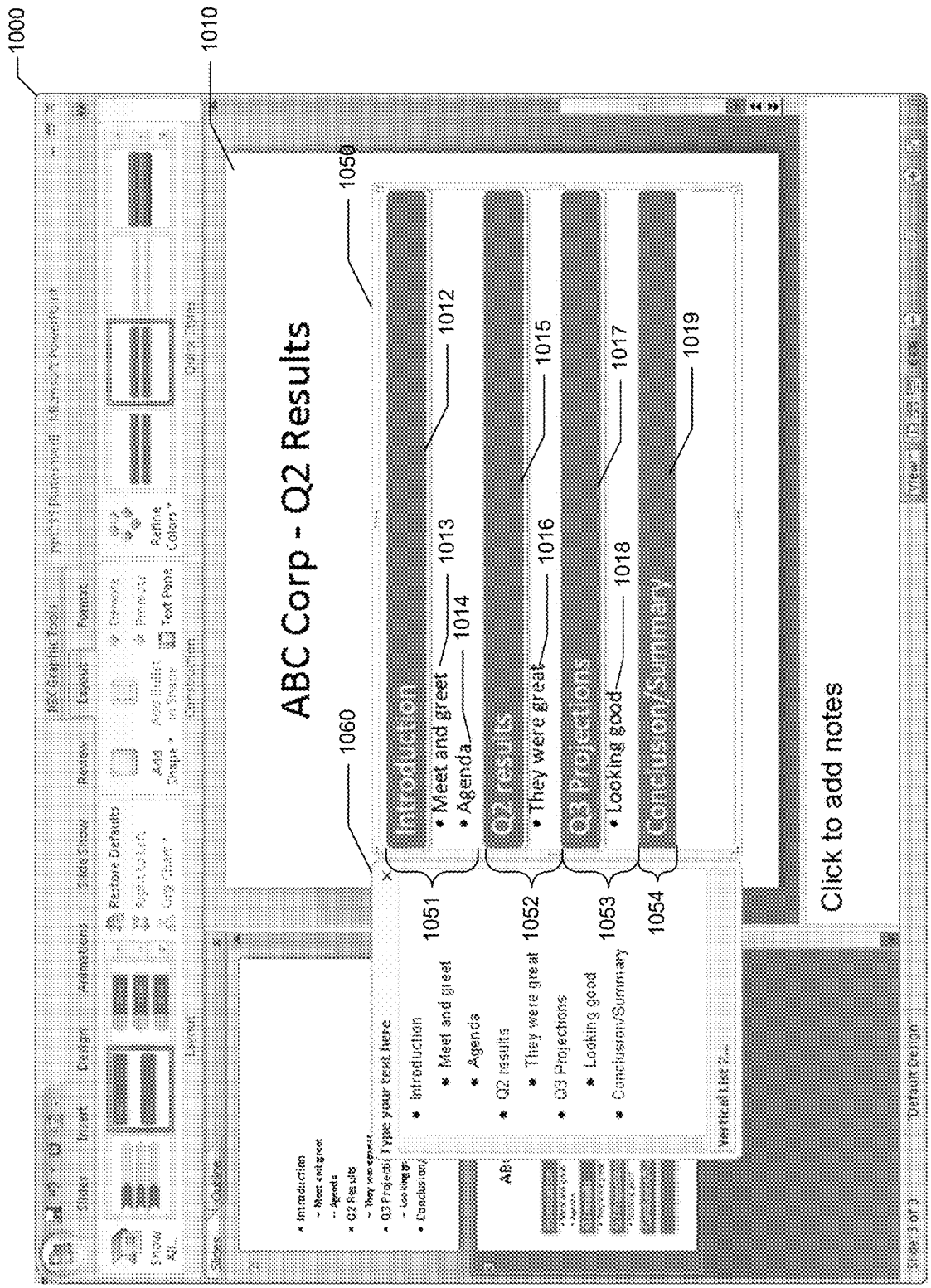
FIG. 10 is a user interface diagram showing a display typically presented by the facility showing the result of changing the generated graphic to a newly-selected graphic design.

FIG. 10 is a user interface diagram showing a display typically presented by the facility showing the result of changing the generated graphic to a newly-selected graphic design. The display is similar to that shown in FIG. 5, in that the document area 1010 contains a graphic and a floating window 1060 contains the text from which the graphic was generated. The graphic 1050, however, is generated in accordance with the graphic design having indication 949 shown in FIG. 9 selected by the user. Like the graphic shown in FIG. 5, it has a major element 1051-1054 for each of the highest-level text lines in the hierarchy, as well as the lower-level text lines shown in connection with the major element for the highest-level text line to which they correspond.

Figure 11:
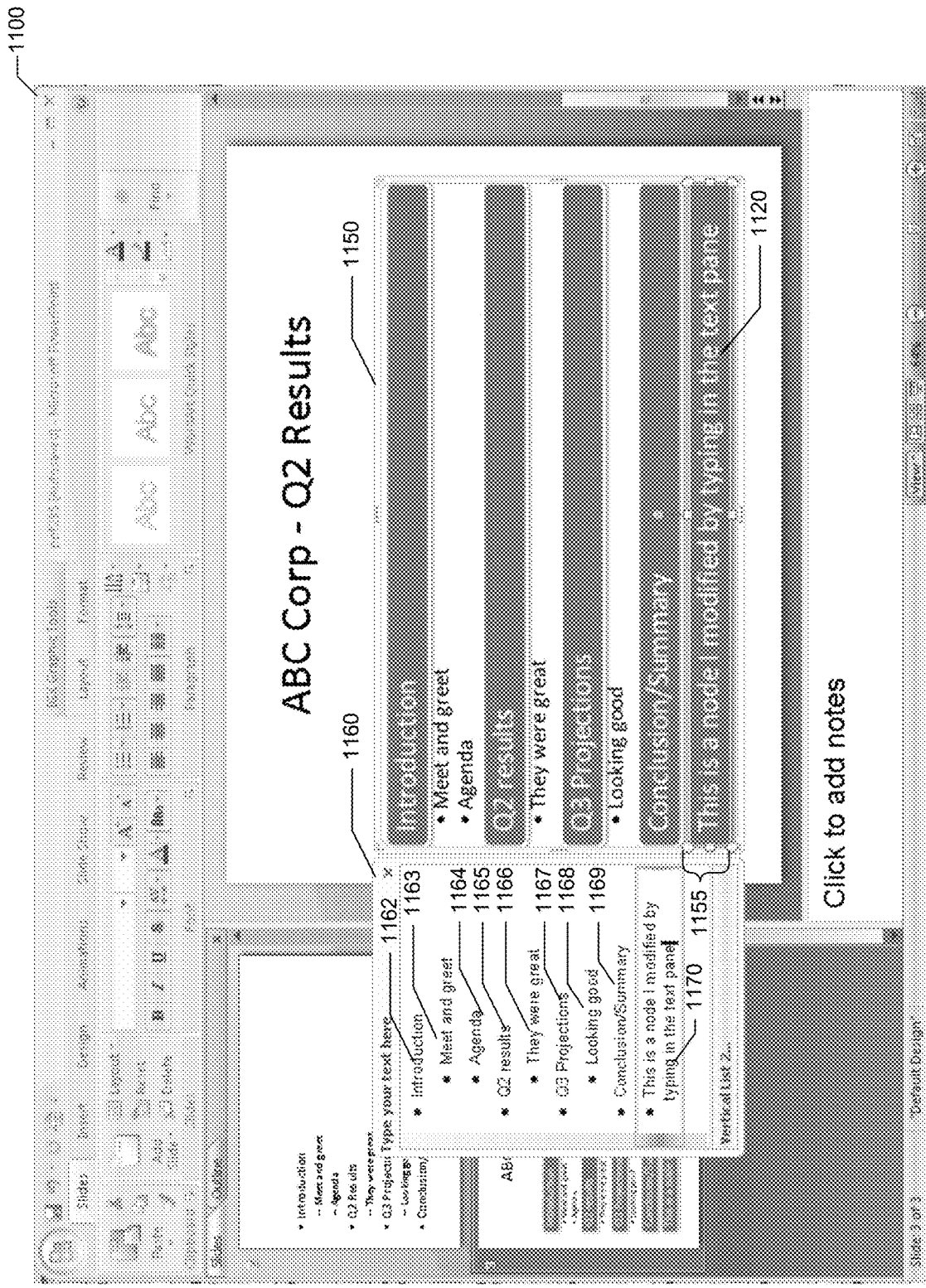
FIG. 11 is a user interface diagram showing a display typically presented by the facility when the user edits the textual hierarchy on which the graphic generated by the facility is based.

In addition to using the controls discussed above in connection with FIG. 8 to alter the graphic generated by the facility, in some embodiments, the user may also edit the textual hierarchy on which the graphic is based. FIG. 11 is a user interface diagram showing a display typically presented by the facility when the user edits the textual hierarchy on which the graphic generated by the facility is based. It can be seen that, in response to the user typing new text line 1170 in textual hierarchy 1160, the user has added a new major element 1155 to the graphic, which contains text 1120 corresponding to new line 1170.

Figure 12:
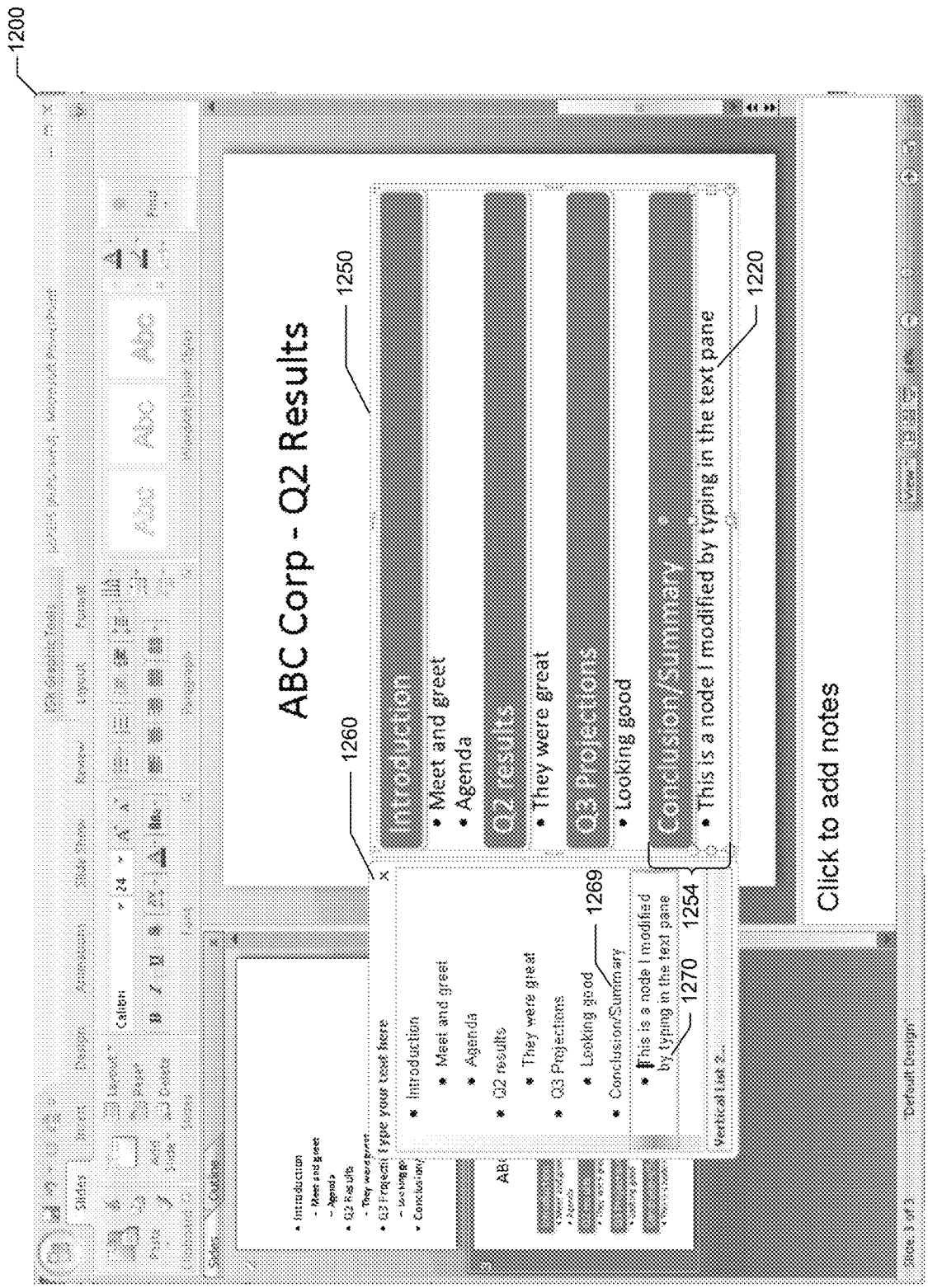
FIG. 12 is a user interface diagram showing a display typically presented by the facility when the user further edits the textual hierarchy to change the level of a text line in the hierarchy.

FIG. 12 is a user interface diagram showing a display typically presented by the facility when the user further edits the textual hierarchy to change the level of a text line in the hierarchy. By comparing FIG. 12 to FIG. 11, it can be seen that the user has changed the level of text line 1170 from the highest level to the lower level, making text line 1270 a child of text line 1269. In response, the facility has removed major element 1155 from the graphic 1150 and added the contents of line 1270 as text 1220 subordinate to major element 1254.

From the foregoing it can be seen that the user can take advantage of the facility to automatically generate graphics based upon hierarchical text, choosing a graphic design for the generated graphic and later changing the graphic design to re-generate the generated graphic; as well as change the hierarchical text in order to change the generated graphic.

Figure 13:
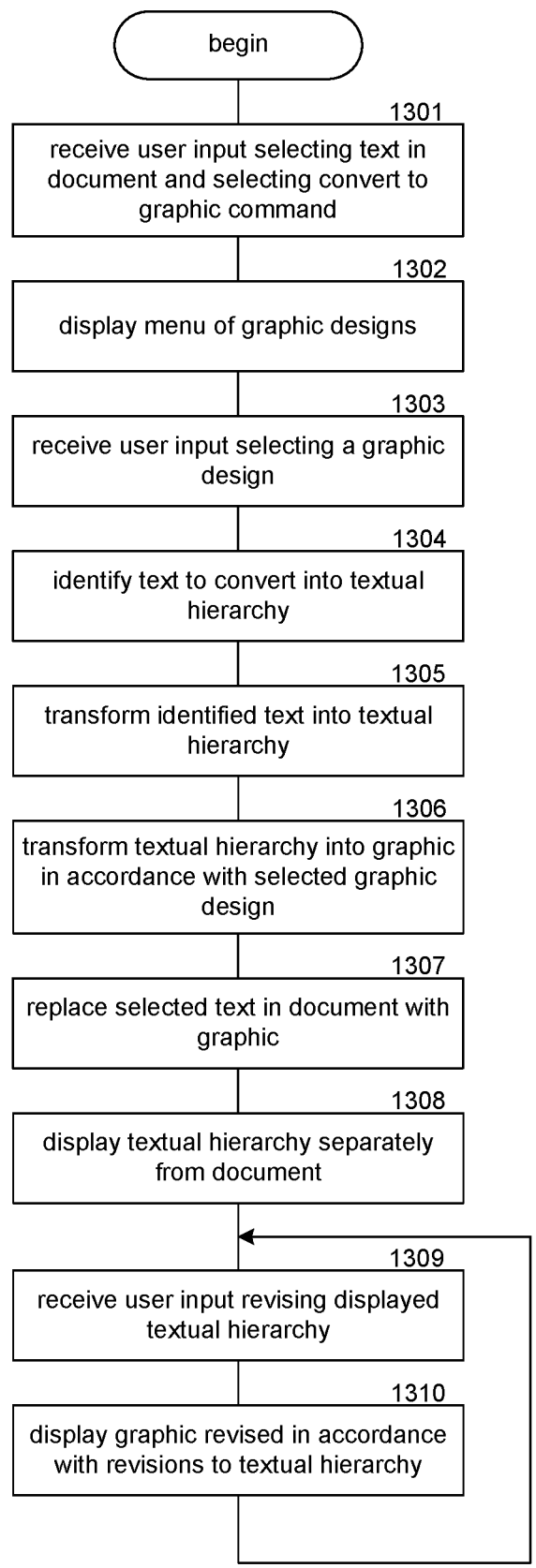
FIG. 13 is a flow diagram showing steps typically performed by the facility in order to generate and alter a graphic based upon arbitrary text in a document, such as a presentation document.

FIG. 13 is a flow diagram showing steps typically performed by the facility in order to generate and alter a graphic based upon arbitrary text in a document, such as a presentation document. In step 1301, the facility receives user input selecting text in a document and selecting a convert to graphic command. For example, the user input may do this as shown in FIG. 4 or FIG. 7. In some embodiments, the received user input selects text by highlighting a particular section of text, or particular text container objects (such as shapes) or portions thereof. In some embodiments, the received user input selects text by positioning a text insertion point at a particular location within the text, or by scrolling a window in which the text is displayed to a particular location in the text. In various embodiments, the facility permits the user to issue a convert to graphic command using a variety of other user interface techniques, such as selecting an item from a pull-down menu or typing a hotkey or a control-key sequence. In some embodiments, the facility automatically invokes the convert to graphic command in response to indirect indications that the user may be trying to create a graphic.

In step 1302, the facility displays a gallery, or "menu" of graphic designs that are available to use to generate the graphic, such as gallery 440 shown in FIG. 4, gallery 670 shown in FIG. 6, gallery 740 shown in FIG. 7, the gallery shown in the layout section 880 of FIG. 8, or gallery 940 shown in FIG. 9. In some embodiments, step 1302 is omitted, and the user selects a graphic design as part of selecting the convert to graphic command, or the facility automatically selects a graphic design.

In step 1303, the facility receives user input selecting a graphic design from the menu displayed in step 1302. In step 1304, the facility identifies text to convert into a textual hierarchy, and ultimately into a graphic, based upon the text selected by the user input received in step 1301. In various embodiments, the facility uses a variety of techniques to identify text in step 1304. In some embodiments, the facility identifies exactly the text that was selected by the user. Where the user selects text by designating a single location in the text, such as a text insertion point or a scroll position, the facility typically selects a body of text around that position, such as all of the text in a line, paragraph or other grouping of lines, page, or other text container containing the designated location in the text.

In step 1305, the facility transforms the text identified in step 1302 into the form of a textual hierarchy.

In step 1306, the facility transforms the textual hierarchy constructed in step 1305 into a graphic in accordance with the selected graphic design. In particular, the facility maps from each element at each level of the textual hierarchy to a corresponding element at a corresponding level in a template provided for the selected graphic design. In some embodiments, the facility performs step 1306 by converting the textual hierarchy constructed in step 1305 to a clipboard format, such as the HTML clipboard format, recognizable by a graphical layout engine. Next, the facility removes the identified text from the presentation—and, in cases where all of the text in one or more containers was selected, removes those containers—and adds a new graphic to the presentation at the same position and size as the removed text and/or text containers. The facility passes the HTML clipboard format hierarchy to the graphical layout engine, which creates elements of the graphic based upon the structure of the HTML clipboard format hierarchy, and populates those elements with the text contained in the HTML clipboard format hierarchy. In some embodiments, the facility performs aspects of step 1306 in accordance with U.S. patent application Ser. No. 10/955,271 filed on Sep. 30, 2004; U.S. patent application Ser. No. 10/957,103, filed on Sep. 30, 2004; and/or U.S. patent application Ser. No. 11/281,076, filed on Nov. 17, 2005, each of which is hereby incorporated in its entirety.

In step 1307, the facility replaces the identified text in the document with the graphic generated in step 1306. In step 1308, the facility displays the textual hierarchy generated in step 1305 separately from the document such as in a floating window like floating window 560 shown in FIG. 5. In step 1309, the facility receives user input revising the textual hierarchy displayed in step 1308. In step 1310, the facility displays in the document a version of the graphic generated in step 1306 that has been revised in accordance with the revisions to the textual hierarchy received in step 1309 if appropriate. After step 1310, the facility continues in step 1309 to receive additional user input revising the textual hierarchy. Though not shown in FIG. 13, as discussed above, the user may also alter the generated graphic in a variety of other ways that do not involve revising the textual hierarchy on which it is based.

Those skilled in the art will appreciate that the steps shown in FIG. 13 may be altered in a variety of ways. For example, the order of the steps may be rearranged; substeps may be performed in parallel; shown steps may be omitted, or other steps may be included; etc.

It will be appreciated by those skilled in the art that the above-described facility may be straightforwardly adapted or extended in various ways. For example, the facility may generate graphics of a wide variety of types, based upon text in a variety of forms, having a variety of different types of formatting. Additionally, the facility may be used in conjunction with a variety of different application types; that is, applications for preparing a variety of different types of documents. Further, the facility may be used by programmatic users rather than human users; for example, the facility may be embodied in a subroutine or a web service called by another program that provides any needed input. While the foregoing description makes reference to particular embodiments, the scope of the invention is defined solely by the claims that follow and the elements recited therein.

We claim:

1. A method in a computing system for transforming textual content into a hierarchical graphic, comprising:
    receiving textual content comprising at least a first line of text and a second line of text, wherein there is a hierarchical relationship between the first line of text as a higher-level line of text and the second line of text as a lower-level line of text;
    receiving a selection of the textual content;
    displaying one or more graphic designs for selection; and
    in response to selecting one or more graphic designs, automatically creating the hierarchical graphic based on the selected textual content, the hierarchical relationship, and a selected graphic design, the hierarchical graphic comprising:
        at least a first graphical element showing the first line of text within the first graphical element; and
        at least a second graphical element showing the second line of text within the second graphical element, wherein there is a hierarchical relationship between the first graphical element and the second graphical element that corresponds to the hierarchical relationship between the first line of text and the second line of text.

2. The method of claim 1, further comprising:
    receiving a selection of a first graphic design, wherein the first graphical element and the second graphical element are created based on the first graphic design.

3. The method of claim 1, further comprising:
    receiving a change to the hierarchical relationship between the first line of text and the second line of text; and
    automatically creating a corresponding change to the hierarchical relationship between the first graphical element and the second graphical element.

4. The method of claim 1, further comprising:
    receiving an edit to at least the first line of text; and
    automatically creating a corresponding edit to at least the first graphical element.

5. The method of claim 1, further comprising:
    receiving a selection of a second graphic design, wherein a third graphical element and a fourth graphical element are created based on the second graphic design.

6. The method of claim 1, further comprising:
    replacing the textual content with the hierarchical graphic.

7. The method of claim 1, further comprising: displaying the created hierarchical graphic.

8. A computer storage device having instructions that when executed by a processing unit cause a computing system to perform a method of generating a hierarchical graphic, the method comprising:
    receiving textual content comprising at least a first line of text and a second line of text, wherein there is a hierarchical relationship between the first line of text as a higher-level line of text and the second line of text as a lower-level line of text;
    receiving a selection of the textual content;
    displaying one or more graphic designs for selection; and
    in response to selecting one or more graphic designs, automatically creating the hierarchical graphic based on the selected textual content, the hierarchical relationship, and a selected graphic design, the hierarchical graphic comprising:
        at least a first graphical element showing the first line of text within the first graphical element; and
        at least a second graphical element showing the second line of text within the second graphical element, wherein there is a hierarchical relationship between the first graphical element and the second graphical element that corresponds to the hierarchical relationship between the first line of text and the second line of text.

9. The computer storage device of claim 8, further comprising:
    receiving a selection of a first graphic design, wherein the first graphical element and the second graphical element are created based on the first graphic design.

10. The computer storage device of claim 8, further comprising:
    receiving a change to the hierarchical relationship between the first line of text and the second line of text; and
    automatically creating a corresponding change to the hierarchical relationship between the first graphical element and the second graphical element.

11. The computer storage device of claim 8, further comprising:
    receiving an edit to at least the first line of text; and
    automatically creating a corresponding edit to at least the first graphical element.

12. The computer storage device of claim 8, further comprising:
    receiving a selection of a second graphic design, wherein a third graphical element and a fourth graphical element are created based on the second graphic design.

13. The computer storage device of claim 8, further comprising:
    replacing the textual content with the hierarchical graphic.

14. The computer storage device of claim 8, further comprising: displaying the created hierarchical graphic.

15. A computing system, comprising:
    at least one processor; and
    at least one memory having computer-readable instructions that when executed by the at least one processor cause the computing system to perform a method, the method comprising:
        receiving textual content comprising at least a first line of text and a second line of text, wherein there is a hierarchical relationship between the first line of text as a higher-level line of text and the second line of text as a lower-level line of text;
        receiving a selection of the textual content;
        displaying one or more graphic designs for selection; and
        in response to selecting one or more graphic designs, automatically creating the hierarchical graphic based on the selected textual content, the hierarchical relationship, and a selected graphic design, the hierarchical graphic comprising:

at least a first graphical element showing the first line of text within the first graphical element; and at least a second graphical element showing the second line of text within the second graphical element, wherein there is a hierarchical relationship between the first graphical element and the second graphical element that corresponds to the hierarchical relationship between the first line of text and the second line of text.

16. The computing system of claim 15, further comprising:

receiving a selection of a first graphic design, wherein the first graphical element and the second graphical element are created based on the first graphic design.

17. The computing system of claim 15, further comprising:

receiving a change to the hierarchical relationship between the first line of text and the second line of text; and automatically creating a corresponding change to the graphical hierarchical relationship between the first graphical shape and the second graphical shape.

18. The computing system of claim 15, further comprising:

receiving an edit to at least the first line of text; and automatically creating a corresponding edit to at least the first graphical element.

19. The computing system of claim 15, further comprising:

receiving a selection of a second graphic design, wherein a third graphical element and a fourth graphical element are created based on the second graphic design.

20. The computing system of claim 15, further comprising: displaying the created hierarchical graphic.

* * * * *

UNITED STATES PATENT AND TRADEMARK OFFICE
CERTIFICATE OF CORRECTION

PATENT NO. : 10,956,660 B2
APPLICATION NO. : 15/351572
DATED : March 23, 2021
INVENTOR(S) : Lawrence Fubini Waldman It is certified that error appears in the above-identified patent and that said Letters Patent is hereby corrected as shown below:

In the Claims

Column 14, Lines 1-3, Claim 17: "corresponding change to the graphical hierarchical relationship between the first graphical shape and the second graphical shape." should read --corresponding change to the hierarchical relationship between the first graphical element and the second graphical element.--

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*